(12) United States Patent
Camble et al.

(10) Patent No.: US 8,838,541 B2
(45) Date of Patent: Sep. 16, 2014

(54) DATA PROCESSING APPARATUS AND METHOD OF PROCESSING DATA

(75) Inventors: Peter Thomas Camble, Bristol (GB); Gregory Keith Trezise, Somerset (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 729 days.

(21) Appl. No.: 12/671,334

(22) PCT Filed: Oct. 25, 2007

(86) PCT No.: PCT/US2007/022585
§ 371 (c)(1), (2), (4) Date: Jan. 29, 2010

(87) PCT Pub. No.: WO2009/054827
PCT Pub. Date: Apr. 30, 2009

(65) Prior Publication Data
US 2010/0198792 A1 Aug. 5, 2010

(51) Int. Cl.
*G06F 7/00* (2006.01)
*G06F 17/00* (2006.01)
*G06F 11/14* (2006.01)

(52) U.S. Cl.
CPC ................... *G06F 11/1451* (2013.01)
USPC ............. 707/640; 707/758; 711/162

(58) Field of Classification Search
None
See application file for complete search history.

(56) References Cited

U.S. PATENT DOCUMENTS

| | | |
|---|---|---|
| 5,369,778 A | 11/1994 | San Soucie |
| 5,638,509 A | 6/1997 | Dunphy |
| 5,990,810 A | 11/1999 | Williams |
| 6,003,114 A | 12/1999 | Bachmat |
| 6,122,626 A | 9/2000 | Brandsma |
| 6,396,838 B1 | 5/2002 | Palnati |
| 6,513,050 B1 | 1/2003 | Williams |
| 6,542,975 B1 | 4/2003 | Evers et al. |
| 6,564,228 B1 * | 5/2003 | O'Connor ............................. 1/1 |
| 6,785,768 B2 | 8/2004 | Peters et al. |
| 6,795,963 B1 | 9/2004 | Andersen |
| 6,839,680 B1 | 1/2005 | Liu |

(Continued)

FOREIGN PATENT DOCUMENTS

| | | |
|---|---|---|
| EP | 2012235 | 1/2009 |
| EP | 2038763 | 3/2009 |

(Continued)

OTHER PUBLICATIONS

Fenstermacher et al.; "Mining Client-Side Activity for Personalization" Department of Management Information Systems, Eller College of Business and Public Administration, University of Arizona, Jun. 2002 (8 pages).

(Continued)

*Primary Examiner* — Alicia Lewis

(57) ABSTRACT

Data processing apparatus comprising: a chunk store having a plurality of chunk sections, each operable to store specimen data chunks, the apparatus being operable to: process an input data set into one or more input data chunks; identify a specimen data chunk in one of said chunk sections which corresponds to a first input data chunk; identify a second input data chunk not corresponding to a specimen data chunk in the chunk store; and store the second input data chunk as a specimen data chunk in proximity to the identified specimen data chunk corresponding to the first input data chunk.

21 Claims, 9 Drawing Sheets

(56) References Cited

U.S. PATENT DOCUMENTS

| | | | |
|---|---|---|---|
| 6,928,526 | B1 | 8/2005 | Zhu et al. |
| 6,938,005 | B2 | 8/2005 | Iverson |
| 6,961,009 | B2 | 11/2005 | McCanne |
| 7,028,158 | B1 | 4/2006 | Beatty et al. |
| 7,065,619 | B1 | 6/2006 | Zhu et al. |
| 7,082,548 | B2 | 7/2006 | Nakano |
| 7,269,689 | B2 | 9/2007 | Eshghi |
| 7,472,242 | B1* | 12/2008 | Deshmukh et al. ............ 711/162 |
| 7,577,817 | B2 | 8/2009 | Karpoff et al. |
| 7,584,338 | B1 | 9/2009 | Bricker et al. |
| 7,593,973 | B2 | 9/2009 | Lee |
| 7,636,827 | B2 | 12/2009 | Asano et al. |
| 7,733,247 | B1 | 6/2010 | He et al. |
| 7,788,233 | B1 | 8/2010 | Iyer et al. |
| 7,913,056 | B2 | 3/2011 | Brown |
| 7,917,722 | B2 | 3/2011 | Yamamoto |
| 7,925,683 | B2 | 4/2011 | Jain |
| 7,979,670 | B2 | 7/2011 | Saliba |
| 8,099,573 | B2 | 1/2012 | Camble |
| 8,140,637 | B2 | 3/2012 | Slater et al. |
| 8,150,851 | B2 | 4/2012 | Jones |
| 8,156,306 | B1 | 4/2012 | Raizen |
| 8,161,255 | B2 | 4/2012 | Anglin |
| 8,332,404 | B2 | 12/2012 | Camble et al. |
| 8,499,131 | B2 | 7/2013 | Lillibridge et al. |
| 8,543,782 | B2 | 9/2013 | Fineberg et al. |
| 2001/0001870 | A1* | 5/2001 | Ofek et al. .................... 711/112 |
| 2001/0010070 | A1 | 7/2001 | Crockett |
| 2001/0011266 | A1 | 8/2001 | Baba |
| 2002/0133491 | A1 | 9/2002 | Sim et al. |
| 2002/0156901 | A1 | 10/2002 | Erickson et al. |
| 2002/0156912 | A1 | 10/2002 | Hurst et al. |
| 2002/0164956 | A1 | 11/2002 | Maltz et al. |
| 2002/0169934 | A1 | 11/2002 | Krapp |
| 2002/0177910 | A1 | 11/2002 | Quarterman et al. |
| 2003/0065898 | A1 | 4/2003 | Flamma et al. |
| 2003/0101449 | A1 | 5/2003 | Bentolila |
| 2003/0140051 | A1 | 7/2003 | Fujiwara et al. |
| 2004/0078293 | A1* | 4/2004 | Iverson et al. .................. 705/27 |
| 2004/0098547 | A1 | 5/2004 | Ofek et al. |
| 2004/0148365 | A1 | 7/2004 | Tripathi |
| 2004/0162953 | A1 | 8/2004 | Yoshida et al. |
| 2005/0091234 | A1 | 4/2005 | Hsu |
| 2005/0108433 | A1 | 5/2005 | Wu |
| 2005/0125599 | A1 | 6/2005 | Gilfix et al. |
| 2005/0131939 | A1 | 6/2005 | Douglis |
| 2005/0204108 | A1 | 9/2005 | Ofek et al. |
| 2005/0210057 | A1 | 9/2005 | Sprague et al. |
| 2005/0228802 | A1 | 10/2005 | Kezuka et al. |
| 2005/0246376 | A1 | 11/2005 | Lu et al. |
| 2005/0268068 | A1 | 12/2005 | Ignatius et al. |
| 2006/0026165 | A1 | 2/2006 | Mohamed et al. |
| 2006/0047855 | A1 | 3/2006 | Gurevich et al. |
| 2006/0059171 | A1 | 3/2006 | Borthakur |
| 2006/0059173 | A1 | 3/2006 | Hirsch |
| 2006/0059207 | A1 | 3/2006 | Hirsch |
| 2006/0069890 | A1 | 3/2006 | Cox et al. |
| 2006/0116990 | A1 | 6/2006 | Margolus et al. |
| 2006/0149703 | A1 | 7/2006 | Poyourow |
| 2006/0167922 | A1 | 7/2006 | Poyourow |
| 2006/0168409 | A1 | 7/2006 | Kahn et al. |
| 2006/0182050 | A1 | 8/2006 | Dohm |
| 2006/0224846 | A1 | 10/2006 | Amarendran et al. |
| 2006/0282457 | A1 | 12/2006 | Williams |
| 2006/0293859 | A1 | 12/2006 | Pipke |
| 2007/0016727 | A1 | 1/2007 | Peters et al. |
| 2007/0022145 | A1 | 1/2007 | Kavuri |
| 2007/0124415 | A1 | 5/2007 | Lev-Ran et al. |
| 2007/0208788 | A1 | 9/2007 | Chakravarty et al. |
| 2007/0220197 | A1 | 9/2007 | Lasser |
| 2007/0250519 | A1 | 10/2007 | Fineberg |
| 2007/0250670 | A1 | 10/2007 | Fineberg |
| 2007/0250673 | A1 | 10/2007 | Eidswick |
| 2007/0250674 | A1 | 10/2007 | Fineberg et al. |
| 2007/0255758 | A1 | 11/2007 | Zheng |
| 2008/0025298 | A1 | 1/2008 | Lev-Ran et al. |
| 2008/0052468 | A1 | 2/2008 | Speiers |
| 2008/0104347 | A1 | 5/2008 | Iwamura et al. |
| 2008/0104443 | A1 | 5/2008 | Akutsu et al. |
| 2008/0120459 | A1 | 5/2008 | Kaneda et al. |
| 2008/0126176 | A1 | 5/2008 | Iguchi |
| 2008/0133536 | A1 | 6/2008 | Bjorner et al. |
| 2008/0133561 | A1 | 6/2008 | Dubnicki |
| 2008/0244210 | A1 | 10/2008 | Vingralek |
| 2008/0256326 | A1* | 10/2008 | Patterson et al. ............. 711/206 |
| 2008/0270461 | A1 | 10/2008 | Gordon et al. |
| 2008/0281877 | A1 | 11/2008 | Wayda et al. |
| 2008/0294660 | A1 | 11/2008 | Patterson et al. |
| 2008/0294696 | A1 | 11/2008 | Frandzel |
| 2008/0298282 | A1 | 12/2008 | Dawson et al. |
| 2008/0301086 | A1 | 12/2008 | Gupta |
| 2008/0301111 | A1 | 12/2008 | Statchuk |
| 2008/0301256 | A1 | 12/2008 | McWilliams |
| 2009/0013129 | A1 | 1/2009 | Bondurant |
| 2009/0013140 | A1 | 1/2009 | Bondurant et al. |
| 2009/0019246 | A1 | 1/2009 | Murase |
| 2009/0037499 | A1 | 2/2009 | Muthulingam |
| 2009/0043830 | A1 | 2/2009 | Lu et al. |
| 2009/0077252 | A1 | 3/2009 | Abdo et al. |
| 2009/0077342 | A1 | 3/2009 | Chen |
| 2009/0112945 | A1 | 4/2009 | Camble |
| 2009/0112946 | A1 | 4/2009 | Jones |
| 2009/0113167 | A1 | 4/2009 | Camble |
| 2009/0234821 | A1* | 9/2009 | Hirsch et al. ...................... 707/3 |
| 2009/0234855 | A1 | 9/2009 | Hirsch |
| 2010/0082765 | A1 | 4/2010 | Murase |
| 2010/0100528 | A1 | 4/2010 | Brockway et al. |
| 2010/0174881 | A1 | 7/2010 | Anglin |
| 2010/0198792 | A1 | 8/2010 | Camble |
| 2010/0198832 | A1 | 8/2010 | Jones |
| 2010/0205163 | A1 | 8/2010 | Eshghi |
| 2010/0223441 | A1 | 9/2010 | Lillibridge |
| 2010/0228999 | A1 | 9/2010 | Maheshwari et al. |
| 2010/0235372 | A1 | 9/2010 | Camble et al. |
| 2010/0235485 | A1 | 9/2010 | Lillibridge |
| 2010/0246709 | A1 | 9/2010 | Lillibridge |
| 2010/0280997 | A1 | 11/2010 | Lillibridge |
| 2010/0281077 | A1 | 11/2010 | Lillibridge |
| 2010/0281230 | A1 | 11/2010 | Rabii |
| 2011/0040763 | A1 | 2/2011 | Lillibridge |
| 2011/0173430 | A1* | 7/2011 | Kacin et al. ........................ 713/2 |
| 2011/0252217 | A1 | 10/2011 | Lillibridge |
| 2012/0137097 | A1 | 5/2012 | Slater et al. |

FOREIGN PATENT DOCUMENTS

| | | |
|---|---|---|
| WO | WO-2004046971 A1 | 6/2004 |
| WO | 2006/030326 A1 | 3/2006 |
| WO | 2006030326 A1 | 3/2006 |
| WO | 2006094365 A1 | 9/2006 |
| WO | 2006094366 A1 | 9/2006 |
| WO | 2006094367 A1 | 9/2006 |
| WO | 2007127248 A2 | 11/2007 |
| WO | 2009054828 A1 | 4/2009 |
| WO | WO-2009054827 | 4/2009 |
| WO | 2009131585 A1 | 10/2009 |

OTHER PUBLICATIONS

Baoyao, Zhou; ""Intelligent Web Usage Mining"" Nanyang Technological University, Division of Information Systems, School of Computer Engineering, 2004 (94 pages).

Baynote Inc.: The Collective Intelligence Platform, Online, http://www.baynote.com/technology/platform/2010 (1 page).

Hottolink Inc.; "Recognize" Online, http://www.hottolink.co.jp/english/reconize.html, 2009 (2 pages).

Andrejko et al.: User Characteristics Acquisition from Logs with Semantics, Slovak University of Technology in Bratislava, 2007 (8 pages).

Hongjun Lu et al: Extending a Web Browser with Client-Side Mining, Hong Kong University of Science and Technology Department of Computer Science, Clear Water Bay, Kowloon, Hong Kong, China, 2003 (12 pages).

(56) References Cited

OTHER PUBLICATIONS

Shankar et al.; ""Personalized Web Search Based on Client Side Ontology"", CS 498: B.Tech Project,10. IIT Kanpur, India 2010 (9 pages).
Sendhikumar et al.; "Personalized ontology for web search personalization" Anna University, Chennai, India , 2008 (7 pages).
Shahabi et al.; "Yoda an Accurate and Scalable Web based Recommendation System?" University of SouthernCalifornia, Los Angeles, Sep., 2001 (14 pages).
Why Wubat? Website User Behavior & Analysis Tool, Wubat, Online, http://www.wubat.com/ (3 pages).
Claypool et al.; "Implicit Interest Indicators", Worcester Polytechnic Institute, Worcester, Computer Science Department Worcester Polytechnic Institute Worcester, MA 01609, USA., 2001 (8 pages).
Shahabi et al.; Efficient and Anonymous Web Usage Mining Based on Client-Side Tracking, University of Southern California, Los Angeles, 2002 (48 pages).
Clattertrap; Online http://www.clattertrap.com; Jul. 20, 2010 (1 page).
HSNW: SRI defense technology spawns civilian application: published Jun. 29, 2010 (2 pages).
Anthony Ha: Facebook investor backs Chattertrap, a personal assistant for content, Jun. 28, 2010 (6 pages).
U.S. Appl. No. 11/411,467, Non-Final Rejection dated Jan. 27, 2009 (pp. 1-9 and attachments).
U.S. Appl. No. 11/411,467, Final Rejection dated Aug. 11, 2009 (pp. 1-11 and attachment).
U.S. Appl. No. 11/411,467, Examiner's Answer dated May 11, 2010 (pp. 1-11 and attachment).
European Patent Office, International Appl. No. PCT/US2007/010015, Search Report and Written Opinion dated Jan. 02, 2008 (12 pages).
European Patent Office, EP 07756010.0, Examination Report dated Feb. 20, 2009 (4 pages).
Muthitacharoen Athicha, et al., "A Low-Bandwidth Network File System," Proceedings of the 18th ACM Symposium on Operating Systems Principles (SOSP '01), Oct. 2001.
L. L. You and C. Karamanolis. Evaluation of Efficient Archival Storage Techniques. In Proceedings of the 21st IEEE / 12th NASA Goddard Conference on Mass Storage Systems and Technologies, pp. 227-232, College Park, Maryland, Apr. 2004.
You L. L. et al., "Deep Store an Archival Storage System Architecture" Data Engineering, 2005. ICDE 2005. Proceedings. 21st. intl Conf on Tokyo, Japan, Apr. 5-8, 2005, pp. 12.
Korean Intellectual Property Office, International Appl. No. PCT/US2007/0022586, Search Report and Written Opinion dated Jul. 23, 2008 (pp. 1-12).
Korean International Property Office, PCT/US2008/061576 Search Report dated Jan. 23, 2009 (2 pages).
Eshghi et al., "Jumbo Store: Providing Efficient Incremental Upload and Versioning for a Utility Rendering Service," 2007 (16 pages).

Mark David Lillibridge et al., U.S. Appl. No. 12/432,804 entitled "Batching Requests for Accessing Differential Data Stores," filed Apr. 30, 2009 (29 pages).
Mark David Lillibridge et al., U.S. Appl. No. 12/432,807 entitled "Copying a Differential DTA Store Into Temporary Storage Media in Response to a Request," filed Apr. 30, 2009 (28 pages).
U.S. Appl. No. 10/870,783, Non-Final Rejection dated Dec. 15, 2006, pp. 1-4 and attachments.
U.S. Appl. No. 10/870,783, Notice of Allowance dated Jun. 13, 2007 (7 pages).
UK Intellectual Property Office Search Report, GB 0511574.6 dated Oct. 19, 2005 (1 page).
UK Intellectual Property Office, Examination Report, GB 0511574.6 dated Jul. 19, 2007 (6 pages).
Translation of Japanese Office Action, JP 2005-173488, Notice of Rejection dated Aug. 5, 2008 (8 pages).
Translation of German Office Action dated Jul. 7, 2006, DE 10 2005023128.4-53 (3 pages).
Translation of German Office Action dated Feb. 7, 2008, DE 10 2005023128.4-53 (6 pages).
Brin, Sergey, et al., "Copy Detection Mechanisms for Digital Documents", Department of Computer Science, Stanford University, Oct. 31, 1994, p. 1-12.
Manber, Udi, "Finding Similar Files in a Large File System," Department of Computer Science, University of Arizona, TR 93-33, Oct. 1993, (11 pages).
Rabin, M.O., "Fingerprinting by Random Polynomials," Technical Report, Center for Research in Computing Technology, Harvard University, 1981, Report TR-15-81 (14 pages).
Korean Intellectual Property Action, International Appl. No. PCT/US2007/022629 Search Report dated Jul. 24, 2008 (2 pages).
Korean Intellectual Property Office, International Appl. No. PCT/US2007/022585 Search Report dated Jul. 15, 2008 (2 pages).
U.S. Appl. No. 12/777,478, Non-Final Rejection dated Oct. 24, 2012, pp. 1-9 and attachments.
U.S. Appl. No. 12/777,478, Non-Final Rejection dated May 3, 2012, pp. 1-10 and attachment.
GB OA2MO, GB1000247.5, Jan. 23, 2012, 9 pps.
GB OA2MO, GB1000247.5, May 30, 2012, 3 pps.
GB1000243.4 OA2MO, Jan. 23, 2012, 9 pps.
GB1000243.4 OA2MO, May 30, 2012, 3 pps.
GB1000248.3, OA2MO, May 30, 2012, 3 pps.
GB1000248.3, OA2MO, Jan. 23, 2012, 9 pps.
Jula et al., "How to Focus on Memory Allocation Strategies," Technical Report TR07-003, Jun. 18, 2007 (29 pages).
Litwin (Linear Hashing: A new tool for file and table addressing), published by IEEE 1980; pp. 212-223.
Prof. David August, "Optimizing Malloc and Free," http://gee.cs.oswego.edu/dl/html/malloc.html (8 pages) (2006).
U.S. Appl. No. 12/777,478 3-month Office Action, HP reference 82261358, Oct. 24, 2012, 13 pp.
U.S. Appl. No. 12/777,478 Notice of Allowance, HP reference 82261358, Mar. 31, 2014, 7 pp.

* cited by examiner

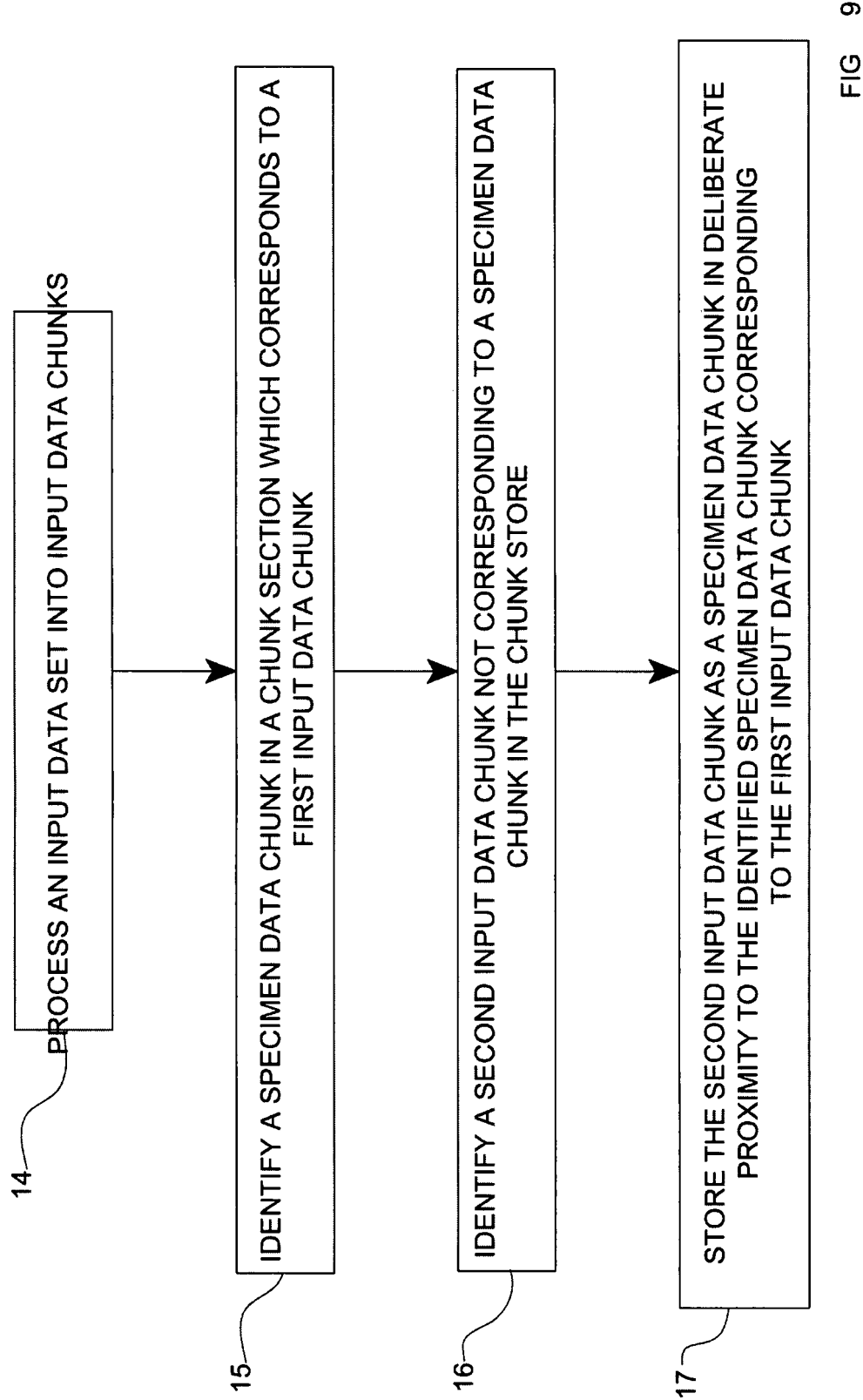

DATA PROCESSING APPARATUS AND METHOD OF PROCESSING DATA

CROSS-REFERENCE TO RELATED APPLICATION

This application is a national stage application under 35 U.S.C. §371 of PCT/US2007/022585, filed 25 Oct. 2007.

BACKGROUND OF THE INVENTION

Data held on a primary data storage medium may be backed-up to secondary data storage medium. The secondary data storage medium may be in a different location to the primary data storage medium. Should there be at least a partial loss of the data on the primary data storage medium, data may be recovered from the secondary data storage medium. The secondary data storage medium may contain a history of the data stored on the primary data storage medium over a period of time. On request by a user, the secondary data storage medium may provide the user with the data that was stored on the primary data storage medium at a specified point in time.

Data back-up procedures may be carried out weekly, daily, hourly, or at other intervals. Data may be backed-up incrementally, where only the changes made to the data on the primary data medium since the last back-up are transferred to the secondary data storage medium. A full back-up may also be performed, where the entire contents of the primary data medium are copied to the secondary data medium. Many other back-up strategies exist.

When backing-up data, a particular part of the data being backed-up may have previously been stored to the primary data storage medium, which may especially be the case when full back-ups are carried out. Storing the same data numerous times represents an inefficient use of a data storage medium.

SUMMARY OF THE INVENTION

In one embodiment of the present invention, there is provided data processing apparatus comprising: a chunk store having a plurality of chunk sections, each operable to store specimen data chunks, the apparatus being operable to: process an input data set into one or more input data chunks; identify a specimen data chunk in one of said chunk sections which corresponds to a first input data chunk; identify a second input data chunk not corresponding to a specimen data chunk in the chunk store; and store the second input data chunk as a specimen data chunk in deliberate proximity to the identified specimen data chunk corresponding to the first input data chunk.

In one embodiment, the data processing apparatus is operable to store the second input data chunk as a specimen data chunk in physical proximity to the identified specimen data chunk corresponding to the first input data chunk.

In one embodiment, the data processing apparatus is operable to store the second input data chunk as a specimen data chunk in the chunk section containing the identified specimen data chunk corresponding to the first input data chunk.

In one embodiment, the data processing apparatus is operable to store the second input data chunk as a specimen data chunk in the chunk store such that both the specimen data chunks corresponding to the first and second input data chunks are operable to be read from the chunk store in a single read/write operation.

In one embodiment, the data processing apparatus is operable to store the second input data chunk as a specimen data chunk in a chunk section physically adjacent the chunk section containing the identified specimen data chunk corresponding to the first input data chunk.

In one embodiment, if at least a predetermined number of input data chunks are found not to correspond to specimen data chunks in the chunk store, the apparatus is operable to store the said input data chunks as specimen data chunks in proximity to one another in at least one chunk section.

In one embodiment, the said at least one chunk section is at least one chunk section other than the chunk section containing the identified specimen data chunk.

In one embodiment, the data processing apparatus is operable to analyse the input data set; and store the second input data chunk as a specimen data chunk in proximity to the identified specimen data chunk corresponding to the first input data chunk, only if the input data set has a predetermined characteristic.

In one embodiment, the predetermined characteristic is that the input data set is deemed by the data processing apparatus to represent a full back up.

In one embodiment, the data processing apparatus further comprises: a manifest store for containing at least one manifest representing at least a part of an input data set and having at least one reference to at least one of said chunk sections, the data processing apparatus being operable to identify a specimen data chunk in one of said chunk sections which corresponds to a first input data chunk by using the at least one manifest.

In one embodiment, at least one chunk section is configured to contain at least one reference to at least one manifest referencing at least one specimen data chunk contained in the at least one chunk section.

In one embodiment, at least one chunk section is operable to maintain a record of the location of at least one specimen data chunk contained in the at least one chunk section.

In one embodiment, the data processing apparatus is operable to associate at least one specimen data chunk in at least one chunk section with a reference to a manifest referencing that specimen data chunk.

In one embodiment, the data processing apparatus is operable to determine when a specimen data chunk is not associated with a reference to manifest and delete the specimen data chunk.

In one embodiment, the data processing apparatus is operable to periodically commission a new chunk store for use by the data processing apparatus, the previous chunk store being retired from use.

Another embodiment the present invention provides a data processor, comprising a plurality of chunk sections, each storing specimen data chunks, the data processor being operable to: process input data into input data chunks; identify at least one input data chunk not already stored in a chunk section as a specimen data chunk; and store said at least one input data chunk, as a specimen data chunk, in a chunk section which does contain a specimen data chunk corresponding to at least one of said input data chunks.

Another embodiment of the present invention provides data storage apparatus comprising: a data storage medium provisioned with a plurality of chunk sections, at least one of said chunk sections storing specimen data chunks; and a read/write head to read information from, or write information to, the data storage medium, the read/write head being operable to read/write a predetermined maximum extent of data in a single operation, the apparatus being operable to: divide an input data set into input data chunks; identify an input data chunk corresponding to a specimen data chunk stored in a chunk section; and store a further input data chunk of the input data set as a specimen data chunk in the data storage medium, such that both the specimen data chunks may be accessed by the read/write head in a single operation.

Another embodiment of the present invention provides a method of processing data using: a plurality of chunk sections, each operable to store specimen data chunks, the method comprising: processing an input data set into input data chunks; identifying a specimen data chunk in a chunk section which corresponds to a first input data chunk; identifying a second input data chunk not corresponding to a specimen data chunk in the chunk store; and storing the second input data chunk as a specimen data chunk in deliberate proximity to the identified specimen data chunk corresponding to the first input data chunk.

In one embodiment, the method further comprises: identifying further input data chunks not corresponding to specimen data chunks already in the chunk store; and storing said input data chunks as specimen data chunks in at least one chunk section containing at least one specimen data chunk that does correspond to at least one input data chunk of the input data set.

Another embodiment of the present invention provides a method of processing data using: a data storage medium provisioned with a plurality of chunk sections storing specimen data chunks; and a read/write head to read information from, or write information to, the data storage medium, the read/write head being operable to read/write a predetermined maximum extent of data in a single operation, the method comprising: arranging at least two specimen data chunks, corresponding to respective input data chunks, on the data storage medium such that the at least two specimen data chunks may be accessed by the read/write head in a single operation.

BRIEF DESCRIPTION OF THE DRAWINGS

Embodiments of the invention will now be described, by way of example only, with reference to the accompanying drawings, in which:

FIG. 9 shows a flow chart of a method according to an embodiment of the present invention.

DETAILED DESCRIPTION

Figure 1:
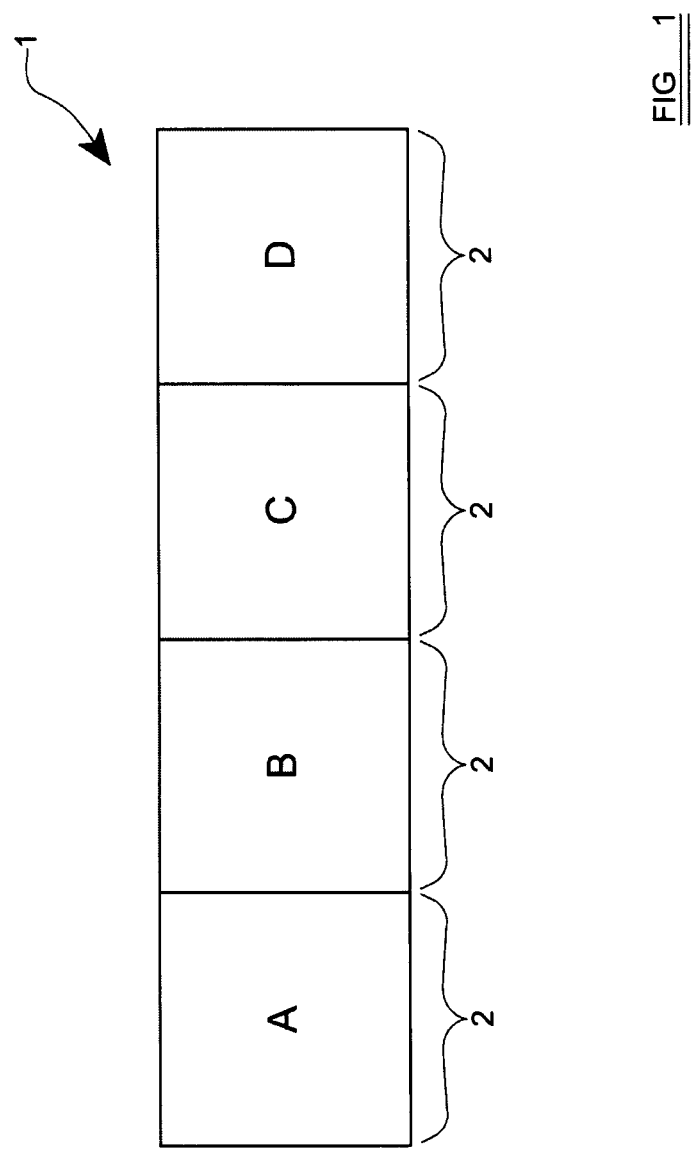
FIG. 1 shows a schematic representation of a data set.

FIG. 1 shows a schematic representation of a data set 1. A data set 1 may be shorter or longer than that shown in FIG. 1. A data set 1 comprises an amount of data, which may be in the order or 10 bytes, 1000 bytes, 10 KB or many megabytes or terabytes. A data set may represent all the data for a given back-up operation, or at least a part of a larger data set.

A back-up data set may comprise a continuous data stream or a discontinuous data stream. Whichever, the data set may contain many distinct, individual files or parts of files. The data set may not be partitioned into the individual files it contains. The data set may contain embedded information, comprising references to the boundaries of the individual files contained in the data set. The data set may then more easily be dissected into its constituent components. The size of the embedded information may represent a significant portion of the total data. Backing-up data with embedded file information increases the required capacity of the data storage medium.

Data processing apparatus according to an embodiment is operable to process an input data set into one or more input data chunks. An input data set may be divided into a plurality of input data chunks. Each input data chunk may represent an individual file, a part of an individual file, or a group of individual files within the input data set. The data set may be processed into input data chunks based on properties of the input data as a whole, with little or no regard to the individual files contained therein. The boundaries of data chunks may or may not be coterminous with file boundaries. The data chunks may be identical or varying in size.

FIG. 1 illustrates a schematic representation of an input data set 1 processed into data chunks 2. For convenience, each input data chunk is labelled in FIG. 1 from A-D, identifying that the data chunks 2 are distinct from one another. The input data set 1 may be divided into more input data chunks 2 than those shown in FIG. 1. An input data set 1 may be many terabytes in size, and be processed into billions of input data chunks. There are specific schemes available to the skilled person to determine how the input data set 1 is processed into input data chunks 2 and which information each input data chunk 2 contains.

Figure 2:
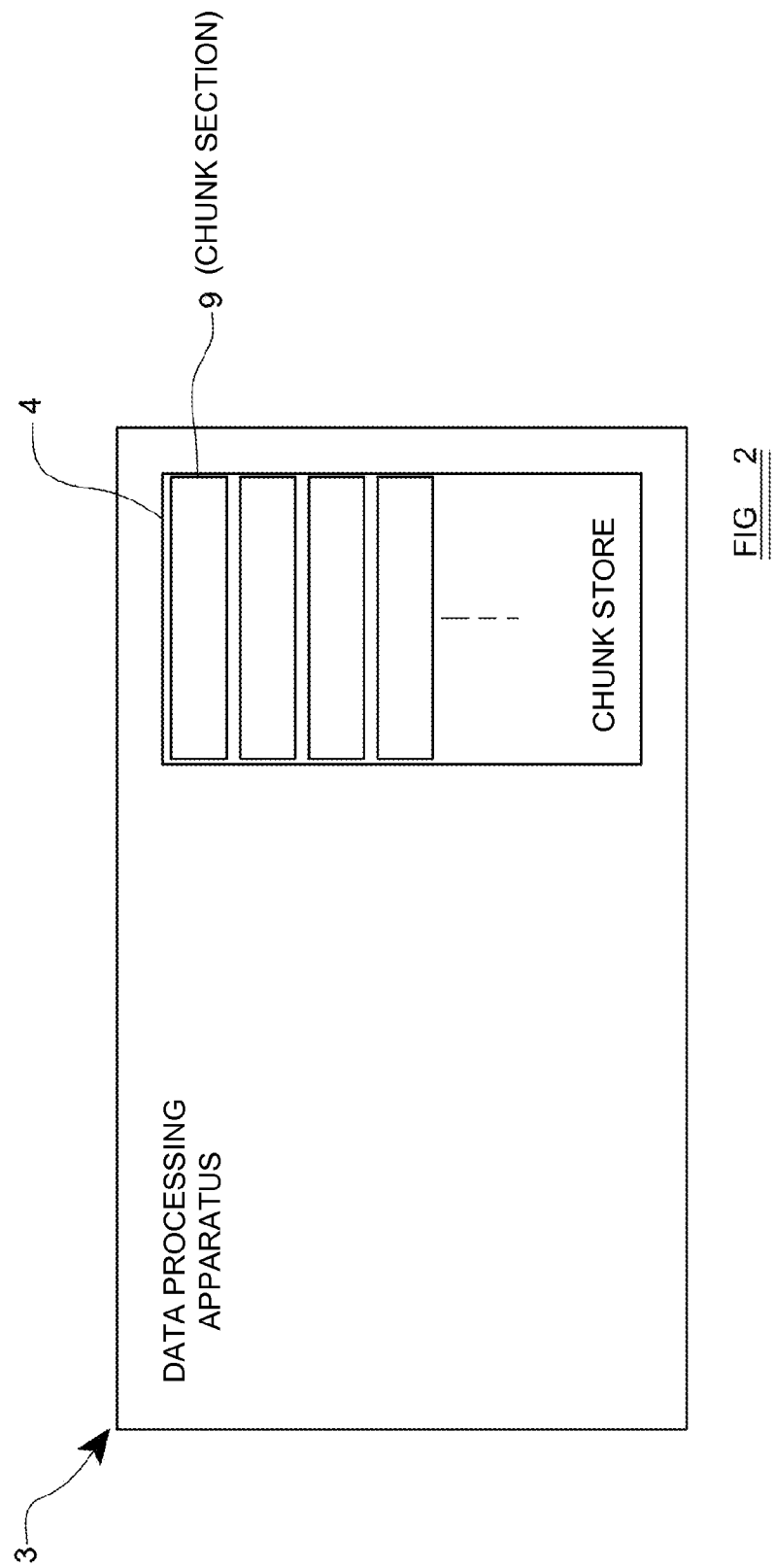
FIG. 2 shows a schematic representation of data processing apparatus according to an embodiment.
Figure 3:
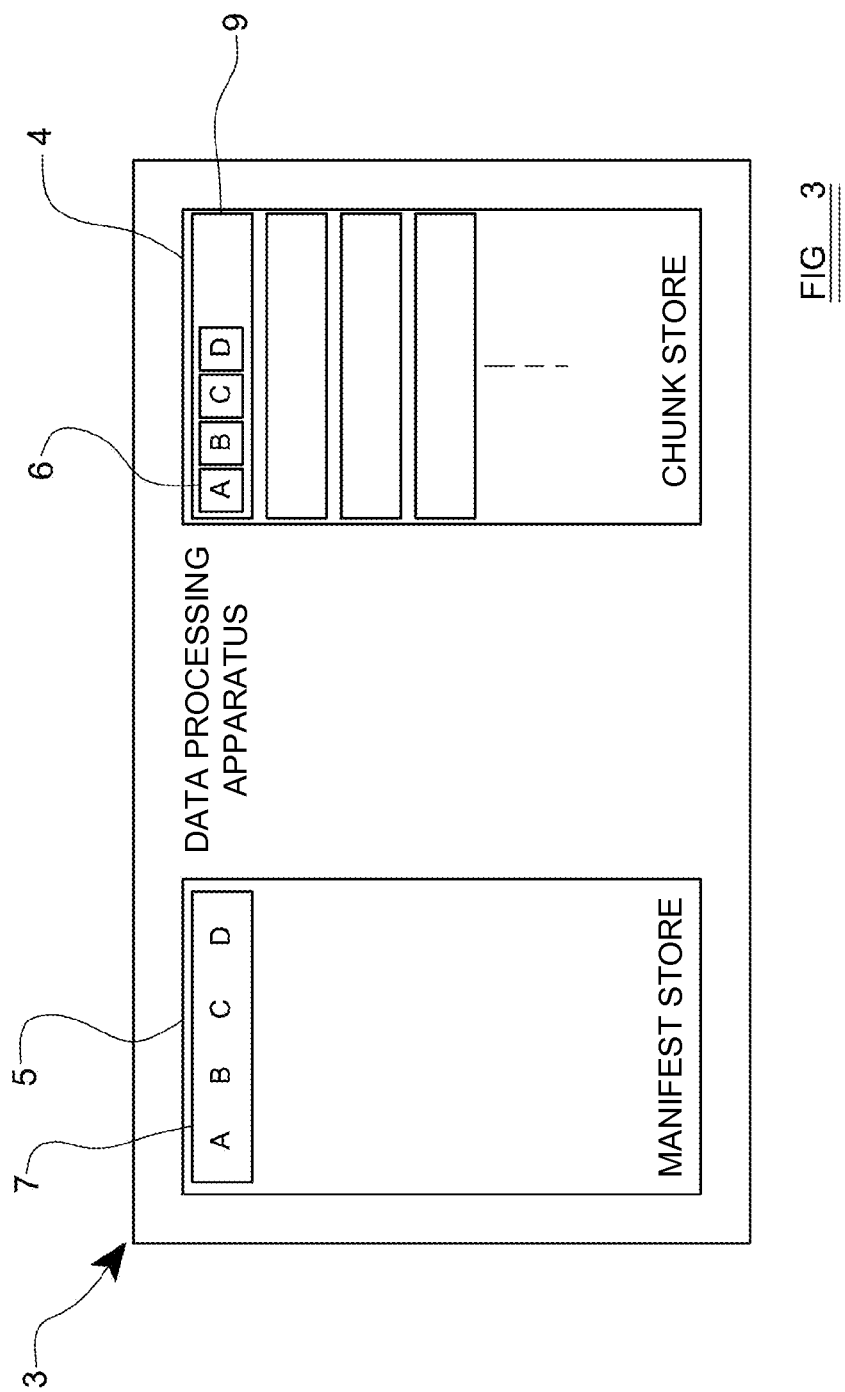
FIG. 3 shows a schematic representation of the data processing apparatus of FIG. 2, in use.

FIG. 2 shows data processing apparatus 3 (including at least one processor) according to an embodiment, comprising a chunk store 4. As an input data set 1 is initially processed by data processing apparatus 3, the input data chunks 2 are stored to the chunk store 4 as specimen data chunks 6, as shown in FIG. 3 (described below). A specimen data chunk 6 is a carbon copy of an input data chunk 2. The chunk store 4 may store a plurality of specimen data chunks 6. The chunk store 4 may contains all the input data chunks 2 that have been previously processed by the data processing apparatus 3.

The chunk store 4 is partitioned into a plurality of chunk sections 9, as shown in FIG. 2. In one embodiment, the chunk sections 9 are configured so as to have a capacity to store a given number of specimen data chunks 6 therein. In another embodiment, the chunk sections 9 are configured so as to have a capacity to store a given total size of specimen data chunks 6. In other words, a chunk section 9 may be operable only to contain specimen data chunks 6 to a predetermined data capacity. It should be appreciated that, in use, as specimen data chunks 6 are added to the chunk sections 9, further chunk sections may be created for subsequent use. Alternatively, a chunk store may be partitioned into chunk sections 9 from the outset. The configuration of the chunk store 5 may be dynamic, and may allow extra capacity to be added during use. A chunk section 9 may only be provisioned by data processing apparatus 3 when required.

The chunk sections 9 may not be physically separate from one another. In one embodiment, the chunk sections 9 may physically be contiguous with one another in the memory in which the chunk store is provided. The boundaries of the chunk sections 9 may be indicated by markers or reference points. In one embodiment, chunk sections 9 may be logically ordered so as to be logically contiguous but physically non-contiguous.

FIG. 3 shows data processing apparatus 3, in use. The data processing apparatus 3 comprises a chunk store 4, partitioned into chunk sections 9, and a manifest store 5. The manifest store 5 may be discrete from, and separate to, the chunk store 4 but both stores 4, 5 may reside on a common data storage medium or memory device. In one embodiment, both the chunk store 4 and manifest store 5 are stored in non-volatile storage.

Associated with each chunk section, there may be "header space" provisioned, for storing information and other data related to one or both of the chunk section itself, or the specimen data chunks contained therein. Such "header space" is separate to and not included within the above noted capacity for storing specimen data chunks. In one embodiment, the 'header space' may not form a physical part of the chunk section; but may be a file stored separately from the chunk section. As a result, additions, deletions and amendments can be made to the information without needing access to the chunk section. This may have particular benefits.

With reference to FIG. 3, as an input data set 1 (shown in FIG. 1) is processed by data processing apparatus 3, the input data chunks 2 are stored in the chunk store 4 as specimen data chunks 6. Specimen data chunks A, B, C and D are added to the first chunk section. In this example, the total size of the specimen data chunks added happens to be less than the capacity of the chunk section. In practice, there may be more or fewer specimen data chunks added to the chunk section. Where there are many specimen data chunks to store in the chunk store, they may be stored in more than one chunk section. The storage of a plurality of specimen data chunks is described below.

It should be appreciated that FIG. 3 is schematic and shown for example only to demonstrate an embodiment of the invention. In some embodiments, each chunk section may be configured to store many hundreds or thousands of specimen data chunks.

Further, as an input data chunk 2 is added to the chunk store 4 as a specimen data chunk 6, a manifest 7 is compiled. A manifest 7 is a representation of a data set 1. The manifest 7 comprises references to specimen data chunks 6 in the chunk store 4 which correspond to the input data chunks 2 comprising the input data set 1. So, the references of the manifest 7 may be seen as metadata to specimen data chunks 6. If the references to specimen data chunks 6 of a given manifest 7 are smaller in size than the specimen data chunks 6 referred to by the manifest 7, then it will be appreciated that a manifest 7 may be smaller in size than the input data set 1 it represents. A manifest may be seen as a copy of the input data set which it represents, wherein input data chunks of the input data have been 'replaced' with a reference to a specimen data chunk which corresponds to the input data chunks. Thus, a manifest may begin as a carbon copy of the input data set, having the same size; and the data size of the manifest is reduced as some input data chunks are replaced by references to specimen data chunks corresponding to the input data chunks.

In one embodiment, a reference in the manifest 7 may not be made to a specimen data chunk 6 directly, but to the chunk section 9 containing that specimen data chunk. The chunk section or chunk store may maintain a record of the location of specimen data chunks 6 within the or each chunk section 9. An advantage of such an embodiment may be that since there are likely to be fewer chunk sections 9 than possible specimen data chunks 6, the size of the reference to the chunk sections 9 may be smaller in size than a reference to a specimen data chunk 6. Consequently, the size of the references in the manifest may be smaller, requiring less memory to store a manifest. In this specification, when a reference to a specimen data chunk is described, it is to be appreciated that a reference to the chunk section containing that specimen data chunk is equally applicable. The two embodiments may be described interchangeably for the sake of brevity; but are both applicable to embodiments of the present invention.

Another advantage of maintaining references to chunk sections as opposed to the individual specimen data chunks stored therein is that the specimen data chunks may be moved around in the chunk section, and the integrity of the reference remains. For example, a housekeeping operation may be performed on specimen data chunks stored in a particular chunk section, in an attempt to remove spaces between specimen data chunks. As a result of such a process, the physical fragmentation of the chunk section may be reduced. If references were to be made to the specimen data chunks directly, following housekeeping, all the references in manifests referring to those specimen data chunks would need to be updated—this may be time consuming and/or computationally intensive. By maintaining references to the chunk section as a whole, the references by the manifest to a chunk section will remain the same after housekeeping, as before. The chunk section will maintain a 'local' record of the locations of specimen data chunks in the chunk section. Updating and amending the 'local' record (which may form at least a part of the information in the 'header space' described above) may be simpler than updating references in manifests in the manifest store.

When an input data set 1 has been processed into input data chunks•2 and a manifest 7 compiled, representing the input data set 1, the manifest 7 is stored in the manifest store 5, as shown schematically in FIG. 3.

If a user of data processing apparatus 3 wishes to recover the data of a given input data set 1—which may relate to a back-up made at a particular point in time—the user will retrieve the corresponding manifest 7 from the manifest store 5. Each reference in the manifest 7 to specimen data chunks 6 in the chunk store 4 is then used to reconstruct the original data set 1.

A schematic representation of a second input data set 11 to be processed is illustrated in FIG. 4(a). Input data set 11 comprises input data chunks E, F, G and H. Since no specimen data chunks corresponding to the input data chunks of input data set 11 exist in the chunk store, all four input data chunks are added to the chunk store as specimen data chunks, as shown schematically in FIG. 5. A manifest is also added to the manifest store, representative of the second input data set 11. The new manifest may contain references to each of the newly added specimen data chunks or to the chunk section in which they are stored—the chunk section, itself, maintaining a record of the specific location of specimen data chunks within the chunk section, as described above.

It will be noted by the reader that the input data chunks of each of the input data sets 1 and 11 were added as specimen data chunks to respective chunk sections. Although this may be advantageous, for reasons that are described below, it is not necessarily an arrangement provided explicitly by some embodiments. With other exemplary sets of input data, some of the input data chunks of data sets may have been added as specimen data chunks to either or both of the two chunk sections. For example, with large data sets, the constituent input data chunks may have been added as specimen data chunks to more than one chunk section. In another example, the input data chunks of more than one input data set may have been added as specimen data chunks to a single chunk section.

The present inventors have found that with the processing of 'real world' data, specimen data chunks are added to the chunk sections such that the average 'fullness' of each chunk section is less than the capacity of a chunk section. Thus, whilst some chunk sections may substantially be full with specimen data chunks, other chunk sections may not be full, and have additional space remaining. The average fullness being less than the capacity of a chunk section may be as a result of the data processing algorithm or algorithms used for processing the data.

Figure 6:
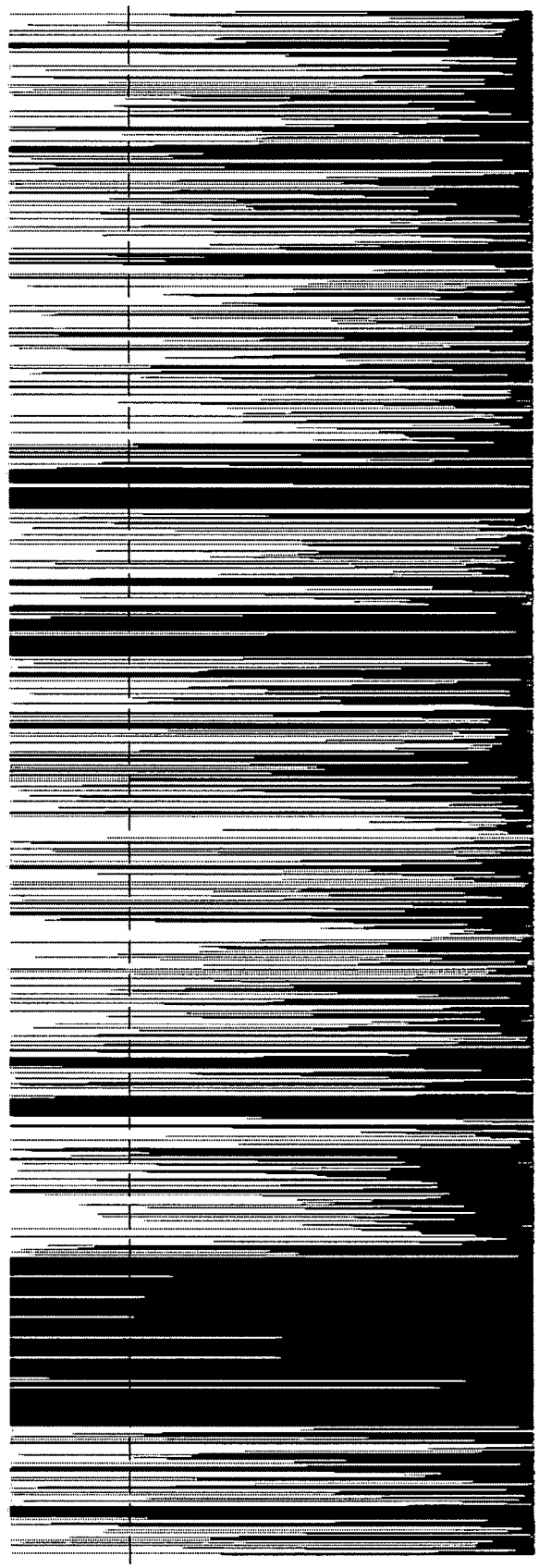
FIG. 6 shows a schematic representation of a plurality of chunk sections containing specimen data chunks.

FIG. 6 illustrates a schematic representation of a plurality of chunk sections storing a plurality of specimen data chunks. Each vertical line illustrates the level of specimen data chunks in a single chunk section. The dotted line indicates the average fullness of all the chunk sections shown.

The inventors have found that the average fullness of chunk sections, having processed 'real-world' data, may be around 80-85%. It will be appreciated that the average fullness may vary depending on the data being processed and the algorithms used. The average level of fullness is not essential to, and does not form part of, an embodiment of the present invention. However, an embodiment of the present invention utilises the fact that the average fullness of the chunk sections is less than the capacity of a chunk section.

By 'real-world data' is meant typical data which may be processed when the data processing apparatus forms part of a data back-up apparatus. Thus, the data may comprise the files which may be stored on a typical commercial data storage medium, having a plurality of users storing multiple files thereon. The data may comprise at least one of the non-exhaustive group of: pictures, photos, word processing documents, comma separated value files, spreadsheets, email data, machine code, etc.

Figure 4:
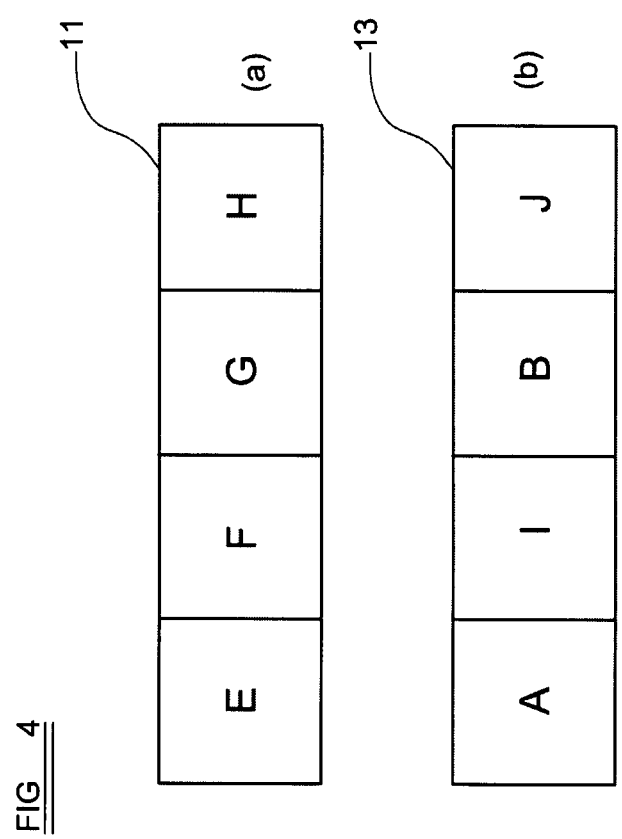
FIG. 4 shows a schematic representation other data sets.
Figure 5:
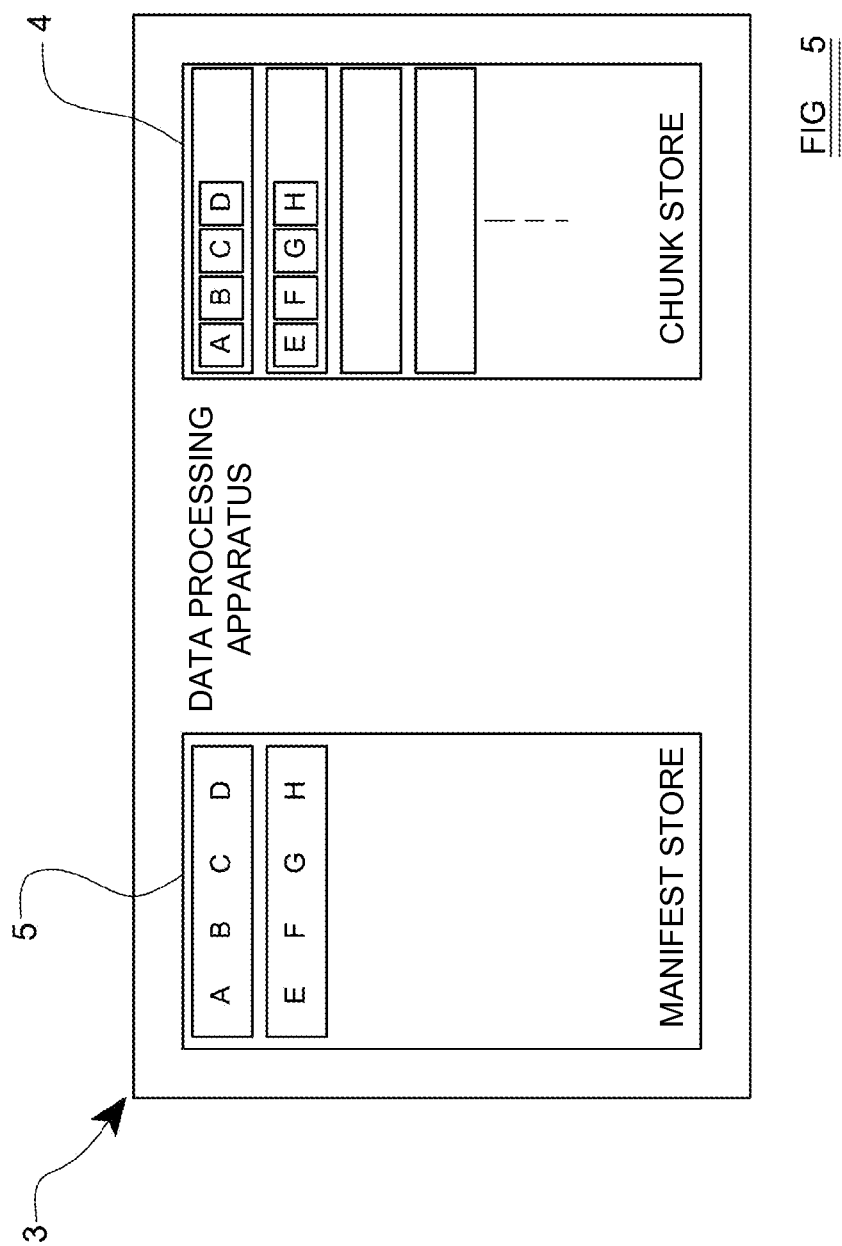
FIG. 5 shows another schematic representation of data processing apparatus according to an embodiment, in use.

Following the processing of (and storing as a manifest) the first 1 and second 11 input data sets, suppose that a third input data set 13 is presented to data processing apparatus, as shown schematically in FIG. 4(*b*). It will be noted by the reader that input data set 13 contains input data chunks A and B, which correspond to specimen data chunks A and B already stored in the first chunk section of the chunk store. In this example, suppose that the input data set 13 represents an updated portion of input data set 1. For example, suppose that input data chunks A and B, found in input data set 1, were files. Following their storage in the chunk store, the files have been updated by a user. Consequently, the files may contain additional information, which may need to be backed up. Thus, input data set 13 is processed by the data processing apparatus. The additional input data chunks I and K may or may not represent the updated information relating to input data chunks A and B.

Alternatively, input data set 1 may represent the contents of a single storage device. The constituent files, i.e. input data chunks A, B, C and D, may be unconnected to one another. The third input data set 13 may be a representation of the latest contents of the storage device, i.e. the files relating to input data chunks C and D have been deleted and new files represented by input data chunks I and J may have been added. A user may wish to maintain a back-up of the storage device at both moments in time.

Without data processing apparatus embodying the present invention, all of the four input data chunks of input data set 13 may be added to the chunk store as four respective specimen data chunks. The four specimen data chunks may be added to a third chunk section.

Data processing apparatus according to an embodiment, on the other hand, is operable to: process an input data set into one or more input data chunks; and identify a specimen data chunk in one of said chunk sections which corresponds to a first input data chunk. Thus, the data processing apparatus is operable to identify whether there already exists a specimen data chunk in the chunk store corresponding to an input data chunk of an input data set being processed. As a convenient consequence, an input data chunk corresponding to a specimen data chunk already stored in the chunk store may not be stored again.

Referring to the third input data set 13, it will be appreciated that data processing apparatus may be operable to identify that there are already specimen data chunks in the chunk store corresponding to input data chunks A and B. Specifically, data processing apparatus may identify that the specimen data chunks A and B are stored in the first chunk section.

Additionally, data processing apparatus may be able to identify that input data chunks I and J of the input data set 13 do not already exist as specimen data chunks in the chunk store.

Even with such an identification being carried out, data processing apparatus not embodying the present invention may simply then store the input data chunks I and J as specimen data chunks in a further chunk section, such as a third chunk section. Or, if there is some space left in the chunk section used to store specimen data chunks for the immediately preceding input data set, then at least one of the input data chunks I and J may be stored in that chunk section. In any event, the storage of specimen data chunks in chunk sections utilising data processing apparatus not embodying the present invention may maintain the chunk sections with a fullness of around 80-85%.

The data processing apparatus according to an embodiment is further operable to identify a second input data chunk of an input data set not corresponding to a specimen data chunk in the chunk store; and store the second input data chunk as a specimen data chunk in proximity to the identified specimen data chunk corresponding to the first input data chunk. In one embodiment, the data processing apparatus is operable to store the second input data chunk as a specimen data chunk in deliberate proximity to the identified specimen data chunk corresponding to the first input data chunk.

By deliberate is meant that the data processing apparatus intentionally and purposefully seeks to store the second input data chunk as a specimen data chunk in proximity to the identified specimen data chunk corresponding to the first input data chunk, as compared to allowing such an event to happen by chance.

Thus, with reference to FIG. 4(*b*), the data processing apparatus is operable to identify that at least one of specimen data chunks A and B exists in the first chunk section, which correspond to the input data chunks A and B of the third input data set 13. Subsequently, data processing apparatus may identify that at least one of input data chunks I and J does not correspond to any specimen data chunks stored in the chunk store. If so identified, the data processing apparatus is operable to store at least one of input data chunks I and J as a specimen data chunk in deliberate proximity to at least one of specimen data chunks A and B already in the chunk store.

Figure 7:
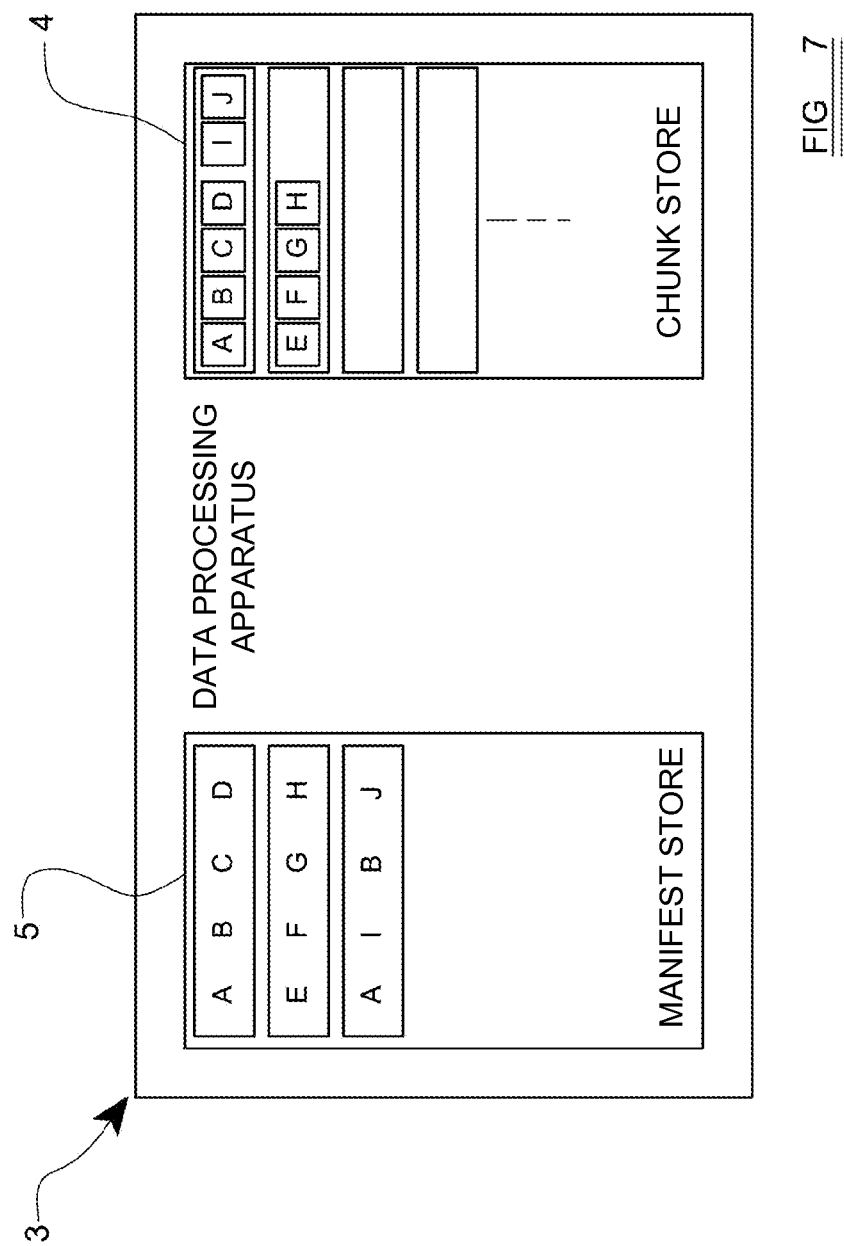
FIG. 7 shows yet another schematic representation of data processing apparatus according to an embodiment, in use.

With reference now to FIG. 7, it will be noted that a manifest representative of the third input data set 13 has been added to the manifest store. Further, it will be noted that specimen data chunks I and J have been added the first chunk section of the chunk store—i.e. in proximity to specimen data chunks A and B. As noted above, the representation of the data processing apparatus is schematic only.

As a convenient result of storing specimen data chunks I and J in the same chunk section as contains specimen data chunks A and B, all the constituent specimen data chunks representing the third input data set 13 are now contained in the same chunk section. The efficiency and speed of recovering the manifest representing the third input data set 13 may therefore conveniently be increased, when compared to the processing of the third input data set 13 by apparatus not embodying the present invention (where specimen data chunks I and J may have been stored in other chunk sections distant from that containing specimen data chunks A and B).

Reading or writing data to the disc or tape requires access to particular physical areas of the disc or tape. It will be appreciated that where the chunk sections are configured to be stored in a contiguous relationship on the disc or tape, access to a plurality of different and separated chunk sections will require multiple read/write operations to be performed on the disc or tape, in order to read the data. Thus, when restoring a data set whose manifest contains references to specimen data chunks stored in a plurality of chunk sections, which may be distributed across the disc or tape, the data recovery process may take significant time to allow for the plurality of read/write operations to be performed.

If input data chunks I and J of input data set 13 were to be added to another (e.g. third) chunk section, then the recovery of the manifest representing the input data set 13 would require access to both the first and third chunk sections. Even with this schematic example, such an arrangement may require two read/write operations to be performed, reducing the speed of data recovery. With real-world data and without some embodiments of the present invention, it will be appreciated that specimen data chunks representing a particular data set may be stored in a plurality of chunk sections spread over a given data storage medium. Not only may the recovery of such data require multiple read/write operations, there may be a relatively significant distance for the read/write head to travel between the chunk sections of interest.

The data processing apparatus is operable to read/write a predetermined amount or size of data in a single read/write operation. The extent of data able to be read may be equal to, or more, or less than, the total size of a chunk section. In one embodiment, the data processing apparatus may be operable to read from/write to a plurality of chunk sections in a single read/write operation.

With reference to FIG. 7, suppose that the data processing apparatus is operable to read from/write to only one chunk section in a single read/write operation. It will be appreciated, therefore, that when using the data processing apparatus according to an embodiment, only one read/write operation is needed to restore each of the three manifests representing the input data sets. Such an arrangement may be advantageous and increase processing and restore speeds and efficiency.

Even if the data processing apparatus is able to read from/write to a plurality of chunk sections in a single read/write operation, it will be appreciated, with reference to the above example, some of the data read may not be required. For example, when recovering a manifest representative of the third input data set 13, the data in second chunk section is not required. So, even if specimen data chunks I and J were stored in the third chunk section, and all chunk sections were able to be read in a single read/write operation, the specimen data chunk data actually of use to the data recovery operation will be interspersed with superfluous data relating to the specimen data chunks in the second chunk section. That superfluous data may still need to be processed before it can be established it is superfluous.

However, when specimen data chunks I and J are stored in the first chunk section, then all of the data required to recover the third input data set 13 will be arranged at the beginning of the extent of data read during the read/write information. Following the retrieval of all the required specimen data chunks, it may be established that no further processing of the read/write data is needed. The amount of 'useful' data which may be recovered from a single read/write operation may therefore be increased with the data processing apparatus.

Suppose that a user of a data storage system is working on a word processing file over a predetermined period of time. During that time, there may be a predetermined number of back-up operations performed. Also during that time, the user may be continuing to amend the word processing file, either by deleting or rearranging text, or adding new text. Each time the word processing file is saved to a primary storage medium (as may be done automatically or manually by the user), the word processing file will change (in size and/or content). The primary data storage medium may be the user's local data storage medium or a shared data storage medium. When a back-up operation is performed, a copy of the word processing file at that moment in time will be backed up to a secondary storage medium. The back-up procedure may be performed periodically or at the request of a user. Whichever, there may exist many different versions of the word processing file on the secondary data storage medium. If the user then wishes to recover any of the versions stored on the secondary storage medium, or if there is a loss of at least a part of the data held on the primary storage medium, then the user may retrieve data from the secondary data storage medium relating to the required version of the file. It is beneficial that each 'version' of the word processing file is able to be restored quickly. It may be particularly beneficial if the most recent version can be restored quickly, as this is the version statistically more likely to be restored by a user. Each 'version' of the file, when processed by the data processing apparatus may represent at least a part of a data set and be represented by at least a part of a manifest. Recover of a version, therefore, may be effected by the recovery of at least a part of a manifest.

Where an incremental data back-up operation is performed, the secondary data storage medium may be configured so as to store the original version of the word processing file, and then 'update' files for each subsequent version. Thus, a recovered version of the most recent word processing file may be compiled from the original version and a plurality of 'updates'.

Suppose that with each back-up operation performed, thousands of other files are also backed-up. As a consequence, without data processing apparatus embodying the present invention, the 'update' files may be interspersed with thousands of other data files, at least some of which are stored as specimen data chunks in the chunk store. Without data processing apparatus embodying the present invention, each of the updates may be stored in a different chunk section, each physically distant from one another. To restore some versions of the word processing file will therefore require a plurality of read/write operations in different areas of the data storage medium. Such an operation may be time-consuming.

Moreover, in restoring such a physically fragmented file, a large majority of the data retrieved in each read/write operation will not be required. Processing such superfluous data may be an inefficient use of data processing apparatus. With embodiments of the present invention, however, at least one of the 'updates' may be conveniently stored in the same chunk section as the original file or at least one of the other 'update' files. In some embodiments, all of the 'updates' may be stored in the same chunk section as a the original file. As a consequence, if the file—at any stage of its updating—is needed to be restored, access may only be needed to the one chunk section (or a number of chunk sections in deliberate proximity to one another). Where the data processing is operable to read from/write to a chunk section in a single read/write operation, the restoration of the file will require only one read/write operation.

It will be appreciated that even if some other 'updates' are stored in different chunk sections, the speed and efficiency of data restoration may still be increased.

Back References

In an embodiment of the present invention, at least one specimen data chunk may have associated with it a reference, or references, to at least one manifest which, itself, references the at least one specimen data chunk. Where input data sets comprise multiple instances of a given input data chunk, which is stored as a specimen data chunk in the chunk store, the specimen data chunk may maintain a record of all of the manifests, representing those input data sets, which comprise a reference to the specimen data chunk. Such references to manifests may be seen as "back references". Where a given manifest references a single specimen data chunk more than once, there need only be one back reference to that manifest associated with the specimen data chunk. A back reference to a manifest may be a reference to the manifest as a whole or to a particular part of the manifest.

In one embodiment, for each input data set processed, the data processing apparatus may store only one occurrence of each input data chunk as a specimen data chunk in the chunk store. Some duplication of input data chunks as specimen data chunks may be permitted.

There are various methods available to the skilled person for determining that a chunk store contains a specimen data chunk corresponding to an input data chunk. These methods are not described in detail in this specification. Further, how the data processing apparatus identifies a chunk section containing a particular specimen data chunk corresponding to an input data chunk is not detailed herein; a method thereof being available to the skilled person.

In some embodiments, after a predetermined period of time or a prespecified event, there may no longer be a need to store a manifest for a particular data set. For example, where the manifests represent back-ups of a data store, the back-up strategy may require that back-up data is only stored for a predetermined time. For example, there may be a requirement only for the data in the past week to be backed up. Any back-ups relating to data older than a week may be deleted to save back-up memory space—and because a user may no longer require the back-up data older than a week. In another embodiment, the older the back up data is, the fewer back-ups the processing apparatus may store for a given time period. For example, there may be stored hourly back-ups for the previous 24 hours, daily back-ups for the previous week, then monthly back-ups for the previous year. At the end of each day, 23 of the hourly back-ups may be deleted, with the one remaining back-up becoming the daily back-up (this example is applicable to a full back-up strategy). Back-ups may therefore be managed according to their age and/or deemed importance.

Physical Fragmentation

It will be appreciated that the deletion of a data set involves the deletion of the corresponding manifest in the manifest store. By deleting a given manifest in the manifest store, the respective references to specimen data chunks in the chunk store—or, in one embodiment, the respective references to the chunk section containing a specimen data chunk—will also be deleted. However, the specimen data chunks themselves, referenced by the deleted manifest may not necessarily be deleted. This is because those specimen data chunks may be referenced by other manifests which have not been deleted and remain in the manifest store. However, should the chunk store contain a specimen data chunk which is exclusively referenced by the deleted manifest, then that specimen data chunk may also be deleted. This is because the data in the specimen data chunk being deleted is not found in any of the data sets represented by the manifests still stored in the manifest store. The deleted specimen data chunk may therefore be of no relevance.

An embodiment of the present invention utilises back references, With such embodiments, when a manifest is deleted, the number of back references associated with a specimen data chunk, or chunk section, referenced by that manifest will be reduced by at least one (exactly one where single references are used). Thus, the number of back references associated with a given specimen data chunk, or chunk section, offers an immediate indication as to how many manifests contain a reference to the specimen data chunk or chunk section. If the number of back references associated with a specimen data chunk or chunk section is reduced to zero, that specimen data chunk or chunk section may be deleted (or at least removed) from the chunk store.

It is be appreciated that where a chunk section contains a plurality of specimen data chunks, it will most likely be rare that every specimen data chunk in the chunk section no longer has a back reference to a manifest associated with it. Thus, it may be rare that a chunk section will be deleted in its entirety.

In one embodiment, although the back references may be associated with a chunk section as a whole, each back reference may be associated with a particular specimen data chunk in the chunk section (the chunk section maintaining a record of its location in the chunk section). In such a case, a chunk section may have a plurality of back references, associated with at least one of the specimen data chunks in the chunk section. Thus, although the chunk section may have many back references, there may reach a point where the chunk section no longer has any back references associated with a particular specimen data chunk in the chunk section. In such a situation, that now redundant specimen data chunk may be deleted from the chunk section, as part of a specific housekeeping operation or in the course of normal operation.

In another embodiment, when a manifest is deleted which is exclusively referenced by a given specimen data chunk (or chunk section), the specimen data chunk (or chunk section) may not immediately be deleted from the chunk store but may be deleted after a predetermined period of time or number of iterations. An advantage of this is that even though there are currently no manifests in the manifest store which reference the specimen data chunk (or chunk section), there may later be a new input data set processed by the data processing apparatus which does contain an input data chunk corresponding to the specimen data chunk (or to a specimen data chunk contained in the chunk section). Indeed, since a previously processed and stored (and now deleted) input data set comprised an input data chunk corresponding to that specimen data chunk, it is likely that a future input data set to be processed may also comprise an input data chunk corresponding to that specimen data chunk—in other words; if it has been seen before, it may be seen again.

In one embodiment, the said specimen data chunk (or chunk section) may not be deleted but moved to a secondary chunk store, for occasional reference by the data processing apparatus. For example, when the data processing apparatus processes an input data set and determines that there is not already a specimen data chunk in the main chunk store corresponding to a given input data chunk of the input data set, then data processing apparatus may explore the secondary chunk store to determine if a specimen data chunk corresponding to the input data chunk already exists in the secondary chunk store. Only if a specimen data chunk does not exist in the secondary chunk store corresponding to the input data chunk, may the input data chunk be added to the main chunk store as a new specimen data chunk.

When specimen data chunks are deleted from a chunk section, it may be said that the chunk section becomes "physically fragmented". The level of fragmentation may depend on the number of remaining specimen data chunks and/or the distance or average distance between the remaining specimen data chunks. The fragmentation may be measured on the average size of the spaces between the remaining specimen data chunk. In some embodiments, it is unlikely that any removed specimen data chunks will be contiguous with one another. Likewise, it is unlikely, in practice, that any remaining specimen data chunks will all be contiguous with one another. As more and more manifests are deleted, along with specimen data chunks exclusively referenced by the deleted manifests, then a chunk section may become even more physically fragmented. Further, a chunk section may be fragmented, or further fragmented, by the fact that there is empty space in the chunk section. In other words, the chunk section has not yet been filled to a capacity with specimen data chunks. Such 'space' counts toward the overall fragmentation of the chunk section.

Embodiments of the present invention may provide a housekeeping procedure, where the physical fragmentation of a chunk section may be reduced or eliminated. In one embodiment, any spaces in a fragmented chunk section may be reduced in number, by rearranging the specimen data chunks remaining in the chunk section (as described above). Various methods of "housekeeping" are available to the skilled person.

Data processing apparatus is operable to identify a specimen data chunk in one of the chunk sections which corresponds to a first input data chunk of an input data set. Further, the data processing apparatus is operable to identify a second input data chunk not corresponding to a specimen data chunk in the chunk store; and store the second input data chunk as a specimen data chunk in deliberate proximity to the identified specimen data chunk corresponding to the first input data chunk.

In one embodiment, the second input data chunk may be adjacent a first input data chunk in the input data set. In one embodiment, the second data chunk may immediately follow the first input data chunk. In another embodiment, the second input data chunk may be within a predetermined distance of the first input data chunk. In other words, there may be a predetermined number of input data chunks between the first and second input data chunks.

In an embodiment of the present invention, the second input data chunk is stored as a specimen data chunk in deliberate proximity to the identified specimen data chunk which corresponds to the first input data chunk.

In one embodiment, the second input data chunk is stored as a specimen data chunk in physical proximity to the identified specimen data chunk corresponding to the first input data chunk. Thus, the second input data chunk is stored as a specimen data chunk next to or near the identified specimen data chunk corresponding to the first input data chunk, on the data storage medium on which the chunk store (and chunk sections) is configured. When the input data set is to be recovered, each of the references in the corresponding manifest will be replaced with the specimen data chunks to which those references refer. Accordingly, for each reference in the manifest, the corresponding specimen data chunk must be accessed and read from the chunk store. Since a read/write operation may only read a predetermined amount of data at a time, it may be beneficial for two specimen data chunks, referenced by the manifest, to be stored in close proximity to one another. As a result, it is likely that both specimen data chunks may be read in the same read/write operation. Benefits may therefore be demonstrated by providing the data processing apparatus where the second input data chunk is stored as a specimen data chunk in proximity to the identified specimen data chunk corresponding to the first input data chunk. In one embodiment, the second input data chunk is stored as a specimen data chunk in physical proximity to the identified specimen data chunk corresponding to the first input data chunk.

Although two specimen data chunks may be stored in physical proximity to one another, it may be that each of the respective specimen data chunks are stored in different chunk sections. For example, suppose that two chunk sections are physically contiguous with one another (adjacent one another). In other words, the boundary between the two chunk sections may be between the two specimen data chunks. However, even though the specimen data chunks may be "logically" stored in separate chunk sections, their physical proximity on the data storage medium upon which the chunk stored has been configured may still allow for both specimen data chunks to be read in a single read/write operation.

In one embodiment, data processing apparatus is operable to store the second input data chunk as a specimen data chunk in the same chunk section as contains the identified specimen data chunk corresponding to the first input data chunk. In other words, both specimen data chunks may be stored within the boundaries of the same chunk section on the data storage medium upon which the chunk store has been configured. In some embodiments, the data processing apparatus may be so configured that the extent of information able to be read in a single read/write operation equals the total capacity of a chunk section. Thus, the total amount of information that may be accessed in a read/write operation may be purposefully coterminous with the amount of information that may be contained in a single chunk section. In such an embodiment, it will be appreciated that storing two specimen data chunks in the same chunk section will allow both specimen data chunks to be read in a single read/write operation. Nevertheless, it will be appreciated that a read/write operation may be carried out such that the "search window" may bridge two adjacent chunk sections. Thus, the second half of the first chunk section will be read, along with the first half of the second chunk section.

In one embodiment, when the second input data chunk is to be added as a specimen data chunk to a chunk section, it may be added at the end of the chunk section. Thus, the specimen data chunk may be added immediately adjacent the last specimen data chunk to be added to the chunk section. Such an arrangement may be seen in the first chunk section shown in FIG. 7. Here, it will be seen that the order of specimen data chunks stored in the first chunk section is ABCDIJ. As described above, specimen data chunks ABCD were first added to the first chunk section. Only when processing the third input data set 13 were specimen data chunks I and J added to the first chunk section. If, in processing any subsequent input data sets, further specimen data chunks are to be added to the first chunk section, those specimen data chunks may again be added to the "end" of the first chunk section—i.e. adjacent specimen data chunk J.

In another embodiment, any specimen data chunk subsequently added to a chunk section may be physically added to the very end of the chunk section. As a result, there may be space left between the initial specimen data chunks added to the chunk section and the subsequent specimen data chunks added to the chunk section. Subsequently added specimen data chunks would therefore be added substantially in between the existing specimen data chunks, eventually filling the "space" there between.

As a result, and with further reference to FIG. 7, when the data processing apparatus restores the third manifest AIBJ, it may, conveniently, only access the first chunk section to recover all of the constituent specimen data chunks. More specifically, manifest AIBJ may be restored by accessing the first, fifth, second and sixth specimen data chunks respectively, in the first chunk section. In one embodiment, even though the required specimen data chunks are not stored contiguously with one another, or in the order in which they are referenced by the manifest, all the constituent specimen data chunks of manifest AIBJ may be accessed from the chunk section in one read/write operation. An advantage being that data may be recovered quickly.

In another embodiment, the second input data chunk which does not correspond to a specimen data chunk already stored in the chunk store, may be stored as a specimen data chunk directly adjacent, or in close proximity to, the identified specimen data chunk corresponding to the first input data chunk.

Figure 8:
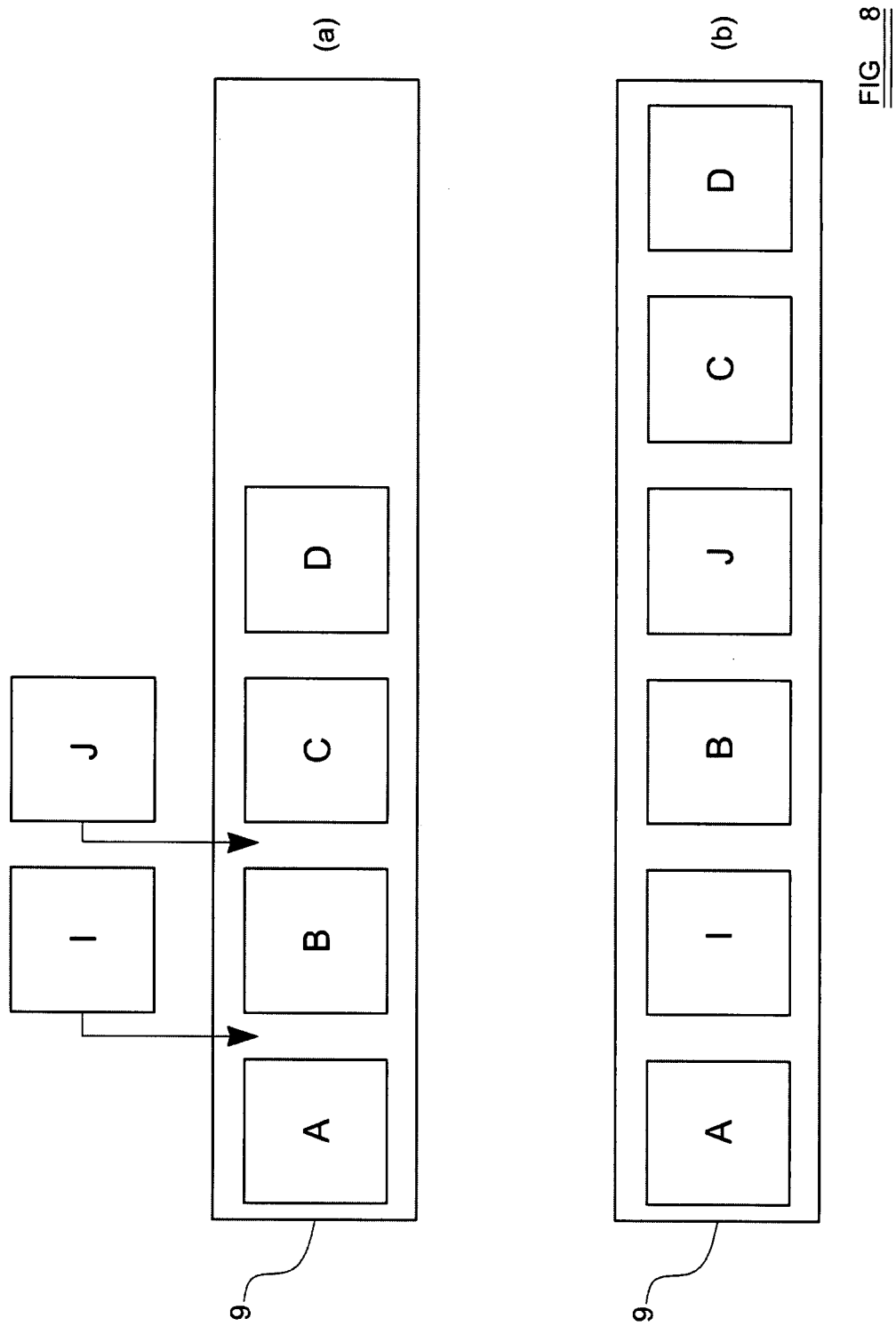
FIG. 8 shows schematic representations of a chunk section of data processing apparatus according to an embodiment, in use.

FIG. 8 shows a schematic illustration of the configuration and contents of a given chunk section 9 at two separate stages. FIG. 8(a) shows a representation of the first chunk section 9, as shown in FIG. 3. At the stage shown in FIG. 8(a), input data chunks I and J of the third input data set 13 have been identified and are to be added as specimen data chunks I and J in the first chunk section, as illustrated schematically. In the embodiment described above, the specimen data chunks I and J were added to the "end" of the first chunk section.

However, in this embodiment of the present invention, the specimen data chunks may be added in close proximity to the specimen data chunks which correspond to other input data chunks of the input data being processed. In the arrangement shown in FIG. 8(a), they are to be added adjacent to the identified specimen data chunks.

For example, in processing the third input data set AIBJ, suppose that the data processing apparatus identifies that specimen data chunk A exists in the first chunk section 9, wherein specimen data chunk A corresponds to input data chunk A of the input data set 13. Subsequently, data processing apparatus identifies that the second input data chunk, I, of the third input data set 13 does not correspond to any of the specimen data chunks stored in the first chunk section, or indeed in any other chunk sections of the chunk store. Accordingly, a specimen data chunk I may be added to the chunk section adjacent the specimen data chunk A. As a result, as shown in FIG. 8(b), specimen data chunks A and I are stored adjacent to one another and in exactly the same order as their corresponding input data chunks in the third input data set 13. Similarly, the same process may be performed on input data chunks B and J, where input data chunk B is the "first input data chunk" and input data chunk J is the "second input data chunk", adhering to the terminology used above.

With reference to FIG. 8(b), it will now be seen that specimen data chunks A,I,B and J are stored in the chunk section in exactly the same order as the corresponding input data chunks A,I,B and J were present in the third input data set 13. Conveniently, when restoring the manifest representative of the third input data set 13, all of the constituent specimen data chunks AIB and J may be read from the chunk section in a single read/write operation. A further benefit of all the specimen data chunks being contiguous with one another is that the read/write operation may not need to access or read any other specimen data chunks. A still further benefit is that all of the returned specimen data chunks A,I,B and J will be in exactly the same order as the third input data set 13. No data manipulation and organisation may need to be performed.

Of course, as a result of the above-described embodiment, specimen data chunks C and D have been shifted to the right by two places. In the schematic illustration of the first chunk section 9 shown in FIG. 7(b), specimen data chunk C and D are now at the "end" of the chunk section.

Further, as a consequence of the above-described embodiment, it will now be seen that specimen data chunks A,B,C and D, constituting the input data chunks of the first input data sets 1, are no longer contiguous with one another. Instead, they are now interspersed with specimen data chunks I and J, which are of no relevance to the first input data set 1. Nevertheless, it is to be noted that the specimen data chunks ABC and D are still in the same order as their corresponding input data chunks of the first input data set 1. In any event, as described above, in an embodiment of the present invention, the extent of data able to be read in a read/write operation may be equal to or greater than the extent of data which may be contained in a single chunk section. In one implementation of the invention, as described above, it is more likely that a user will wish to recover the most recent data set. Thus, in using data processing apparatus according to an embodiment, the specimen data chunks corresponding to the most recent backup will likely be stored in close proximity to one another, allowing more efficient retrieval of the data set possible.

In an embodiment of the invention, having identified a second input data chunk not corresponding to a specimen data chunk in the chunk store, the data processing apparatus is operable to identify subsequent input data chunks, adjacent the second input data chunk in the input data, which also do not correspond to specimen data chunks in the chunk store. Both the subsequent and second input data chunks may be stored as specimen data chunks in the chunk section containing the identified specimen data chunk corresponding to the first input data chunk.

In one embodiment, the order of the specimen data chunks corresponding to the second and subsequent input data chunks, when added to the chunk section, substantially matches the order in which the second and subsequent input data chunks appeared in the input data set.

In another embodiment, data processing apparatus is operable to store the second input data chunk as a specimen data chunk in a chunk section physically adjacent the chunk section containing the identified specimen data chunk corresponding to the first input data chunk. In one embodiment, the second input data chunk is stored as a specimen data chunk in the next chunk section along from the chunk section containing the identified specimen data chunk corresponding to the first input data chunk. Thus, in one embodiment, the order of the first and second input data chunks is reflected by the order of the corresponding specimen data chunks.

Suppose, for example, that the chunk section containing the identified specimen data chunk corresponding to the first input data chunk does not have any available capacity for any further specimen data chunks. In practice, this means that other specimen data chunks have already been added to the chunk section, reaching its capacity.

In such a situation, embodiments of the present invention are operable to store the second input data chunk as a specimen data chunk in a chunk section physically adjacent the chunk section containing the identified specimen data chunk corresponding to the first input data chunk.

Thus, should one of the chunk sections adjacent the chunk section containing the identified specimen data chunk (which corresponds to the first input data chunk) have capacity to store additional specimen data chunks, then a specimen data chunk corresponding to the second input data chunk may be added thereto. The benefit of such an arrangement is that the specimen data chunk may be in physical proximity to the specimen data chunk corresponding to the first input data chunk. As a consequence, both specimen data chunks may be read from the chunk store in a single read/write operation. However, even where data processing apparatus according to an embodiment is configured such that a read/write operation cannot read both chunk sections at the same time, then at least both chunk sections may be physically contiguous with one another. As a consequence, both the required read/write operations may be performed one after another, with minimal travel of the read/write head being required between read/write operations.

In one embodiment, as described above, the second input data chunk is stored as a specimen data chunk in the next chunk section along from the chunk section containing the identified specimen data chunk corresponding to the first input data chunk. Thus, in one embodiment, the order of the first and second input data chunks is reflected by the order of the corresponding specimen data chunks.

In one embodiment, the second input data chunk may be added as a specimen data chunk to a chunk section which is logically adjacent the chunk section containing the identified specimen data chunk corresponding to the first input data chunk. As described above, logically adjacent chunk sections may not, necessarily, be physically adjacent one another in the chunk section. As a consequence, with physically separated chunk sections, it is unlikely that a single read/write operation may be able to read specimen data chunks in each of the separated chunk sections.

However, even though the two respective chunk sections may be physically separate from one another on the data storage medium on which the chunk store has been configured, the two chunk sections are logically adjacent one another. A benefit of such an embodiment is that if the contents of two chunk sections are to be combined (discussed below in 'chunk section management'), the logical ordering of two chunk sections allows for data processing apparatus according to an embodiment to identify two logically adjacent—but physically separate—chunk sections whose contents might beneficially be stored in the same chunk section. As a convenient consequence, all the contents of that newly combined chunk section may be accessed in a single operation whereas, before, access may have been required to each of the logically adjacent, but physically separate—chunk sections.

In another embodiment of the present invention, having identified a chunk section which contains a specimen data chunk corresponding to the first input data chunk, and it is determined that the chunk section is already full, instead of adding a specimen data chunk corresponding to a second input data chunk to a chunk section which is physically or logically adjacent the chunk section containing the identified specimen data chunk, a new chunk section may be provided by data processing apparatus. The new chunk section may be logically ordered so that it is adjacent the chunk section containing the identified specimen data chunk. As with the above-described embodiment, however, the new chunk section may not be physically adjacent or proximate the existing chunk section containing the identified specimen data chunk.

Clustering

Suppose that for a given input data set being processed by data processing apparatus, only one of the input data chunks currently exists as a specimen data chunk in a chunk section in the chunk store. The remaining input data chunks may be "new" data chunks and will need to be stored in the chunk store as specimen data chunks.

In one embodiment, having identified a specimen data chunk in a chunk section which corresponds to the input data chunk of the data set being processed, the second and all subsequent input data chunks not corresponding to specimen data chunks in the chunk store may be added as specimen data chunks to that chunk section. In the case where a large number of input data chunks are to be added as specimen data chunks to the chunk section, it will be appreciated that that chunk section may then reach its capacity. In such cases, data processing apparatus may, instead, store those second and subsequent specimen data chunks in a new chunk section, which may be logically ordered to be adjacent the chunk section containing the identified specimen data chunks.

In one embodiment, for a given input data set, having identified the input data chunks of the input data set which do not correspond to any specimen data chunks already in the chunk store, at least some or all of those input data chunks may be added to a new or empty chunk section as specimen data chunks, which chunk section may be logically ordered so as to be adjacent or in proximity to a chunk store containing the identified specimen data chunk or chunks.

In one embodiment, if at least a predetermined number of input data chunks of an input data set are found not to correspond to specimen data chunks in the chunk store, the apparatus is operable to store the said input data chunks as specimen data chunks in at least one chunk section. In one embodiment, the at least one chunk section may be the same chunk section. The specimen data chunk may be clustered together in proximity to one another.

An advantage of the above embodiment is that specimen data chunks may not be added to a plurality of chunk sections, filling in the "gaps" in each. Instead, all of the new specimen data chunks are added to a single or plurality of adjacent chunk sections so that they are stored together. Restoration of those specimen data chunks may be performed in one or just a few read/write operations. Where specimen data chunks are added to a plurality of chunk sections, until each chunk section reaches its capacity, then a plurality of read/write operations may be required, which may decrease the efficiency of the data processing apparatus.

Chunk Section Management

As described above, manifests representative of data sets are occasionally deleted from the manifest store. Occasionally, where a given specimen data chunk is exclusively referenced by the deleted manifest, then there may no longer be a need to maintain that specimen data chunk in the chunk store and it may be deleted (in one embodiment, using back-references). As a consequence, the number of specimen data chunks stored in a given chunk section may reduce. In one embodiment of the present invention, data processing apparatus provides chunk section management. In one embodiment, the data processing apparatus is operable to determine whether the total size of all the specimen data chunks in two physically or logically adjacent chunk sections are smaller than the capacity of a single chunk section. If this is the case, then the data processing apparatus may be operable to move the specimen data chunks held in one of the two physically or logically adjacent chunk sections to the other of the two physically or logically adjacent chunk sections. In one embodiment, two chunk sections may only be so combined if the total resultant size of the combined chunk section is substantially within a predetermined range. The predetermined range may be the 80% to 85% fullness described above. Thus, in such an embodiment, two chunk sections may only be combined if the resultant chunk section offers additional space to add further specimen data chunks.

A benefit of combining chunk sections is that data processing apparatus may be more efficient in storing data. Further, there is consequently one "empty" chunk section, which may be used for storing subsequent specimen data chunks.

In one embodiment, the data processing apparatus is operable to attempt to 'level' the specimen data chunks stored in chunk sections. In one embodiment, the specimen data chunks in chunk sections will be moved between chunk sections so that each chunk section contains substantially an average number or amount of specimen data chunks. In another embodiment, the number or amount of specimen data chunks in each chunk section may be maintained within a predetermined level (e.g. 80% to 85% fullness, as described above). Such a procedure may be termed 'levelling'.

In one 'levelling' operation, at least one specimen data chunk of a given chunk section may be chosen to be moved to another chunk section because it is referenced by a manifest which also references a specimen data chunk in the said another chunk section. As a result, the two specimen data chunks, referenced by the same manifest, may be stored in the same chunk section, bringing about the benefits discussed in detail above. Moreover, a further benefit is that space will be made available in the previous chunk section to accommodate further specimen data chunks.

In one embodiment, specimen data chunks may be moved between chunk sections which are at least logically adjacent one another. Thus, the chunk sections may not necessarily be physically adjacent one another but a record is kept of their logical order.

When specimen data chunks are moved, either within a chunk section or between chunk sections, the back references, described above, may be utilised. In one embodiment, as a specimen data chunk is moved, or otherwise its details amended, the associated back references may be used to identity the at least one manifest having a reference to that specimen data chunk. Those identified manifests may then be updated to reflect the change in location of the specimen data chunk. It will be appreciated that in an embodiment where a manifest references the chunk section generally, and not the specimen data chunks within the chunk section, no such updating may be required. However, in one embodiment, when specimen data chunks are moved between chunk sections, a reference of a manifest will need to be amended to refer to the new chunk section.

Back-Up Determination

In one embodiment, data processing apparatus is operable to analyse the input data set; and store the second input data chunk as a specimen data chunk in deliberate proximity to the identified specimen data chunk corresponding to the first input data chunk, only if the input data set has a predetermined characteristic.

In one embodiment, the predetermined characteristic is that the input data set has been determined to relate to a "full" back-up data set, as opposed to a "incremental" back-up data set.

A "full" back-up is where an entire copy of the data storage medium being backed up is made. Even if only a few changes have been made to the data storage medium between full back-ups, any subsequent full back-ups will still copy the entire contents of the data storage medium. This is despite the fact that a majority of the contents of each full back-up may be identical to one another.

An incremental back-up, on the other hand, may only back up the differences in the data stored on the data storage medium since the previous, or first, back-up. Thus, where a small section of the data on a data storage medium has been added to, amended, or deleted, only those changes may be communicated to the back-up apparatus.

Since a full back-up data set is likely to be large, the requirement for better performance and greater efficiency in restoring a full back-up data set may be more important than the processing speed and efficiency experienced in restoring an incremental back-up, which may be an order of magnitude, or more, smaller than a full back-up. Accordingly, in some embodiments, it is beneficial to ensure that the performance of data processing apparatus when restoring a full back-up data set is optimised.

In one embodiment, therefore, a second input data chunk is stored as a specimen data chunk in deliberate proximity to identified specimen data chunk corresponding to a first input data chunk, only if the input data set has been determined by the data processing apparatus to comprise a "full" back-up.

There may be various mechanisms by which the characteristic of an input data set may be determined. One mechanism is to assess the proportion of input data chunks of an input data set having corresponding specimen data chunks in the chunk store ("existing chunks"), to the number of input data chunks which do not have corresponding specimen data chunks in the chunk store ("new chunks").

It will be appreciated by the reader that an incremental back-up is likely to contain a high number of new chunks, when compared to the existing chunks it contains. On the other hand, when processing a full back-up data set, it is likely that a large majority of the data set may have previously been processed and stored in the chunk store. Thus, for a given full back-up input data set, there is likely to be a high proportion of "existing chunks" to "new chunks".

Accordingly, the predetermined characteristic may be that the proportion of existing chunks to new chunks is above a predetermined level. Thus, the input data sets will only have the "predetermined characteristic" when a high proportion of the input data chunks are "existing" input data chunks, indicating that the input data sets relates to a full back-up.

In some implementations of data back-up systems, data back-up sets are stored to an external media storage system, such as disc or tape. The benefits of such an arrangement are that the discs or tapes may be stored in a different geographical location to the main data storage medium, to assist in disaster recovery situations.

In some situations, an incremental back-up data set may be smaller than the total capacity of the disc or tape being used to store the back-up data. Accordingly, the data associated with each back-up may be appended to the previous data on the disc or tape, so as to fully utilise the available memory in the disc or tape.

In some arrangements, whenever a full back-up is being made, a new disc or tape is sometimes provided, as opposed to appending the data corresponding to the full back-up data set to previously stored data. In another arrangement, whenever a full back-up data set is being stored to a disc or tape, all of the data currently existing on that disc or tape may be overwritten, depending on the data back-up schedule employed by the user.

In one embodiment, the predetermined characteristic may be that the medium on which the back-up data set has been provided (e.g. disc or tape media) was overwritten or "new" when the input data set was stored thereto. The medium may be configured so as to carry a "flag" (electronic or otherwise) to indicate the condition of the media. The predetermined characteristic may be that the flag is set.

In some data back-up schedules, full back-ups are scheduled to be performed on certain days of the week, or at certain times of the day, whereas incremental back-ups are scheduled to occur on other days or at other times of the day. Accordingly, the predetermined characteristic may be that the input data set was created at or within a certain time-frame, which is known to be a period within which full back-ups are made.

In an embodiment of the present invention, a determination as to whether a data set comprises a 'full' or 'incremental' back-up may only accurately be determined when all of the data set has been processed and analysed. Accordingly, in one embodiment, data processing apparatus is operable to perform the determination as to whether a data set represents a 'full' or 'partial' back-up after having analysed and stored the data set. Should it be determined that the data set is a full back-up, then a housekeeping operation may be performed, off-peak or otherwise, to re-arrange and order the specimen data chunks according to the procedures disclosed herein. In one embodiment, the back references associated with each specimen data chunk may be utilised.

When specimen data chunks are moved, either within a chunk section or between chunk sections, the back references, described above, may be utilised. In one embodiment, as a specimen data chunk is moved, or otherwise its details amended, the associated back references may be used to identity the at least one manifest having a reference to that specimen data chunk. Those identified manifests may then be updated to reflect the change in location of the specimen data chunk. It will be appreciated that in an embodiment where a manifest references the chunk section generally, and not the specimen data chunks within the chunk section, no such updating may be required. However, in one embodiment, when specimen data chunks are moved between chunk sections, a reference of a manifest will need to be amended to refer to the new chunk section.

Periodic Commission of New Chunk Store

In one embodiment of the present invention, there is provided data processing apparatus which is operable to periodically commission a new chunk store for use by the data processing apparatus, the previous chunk store being retired from use.

It will be appreciated that as a plurality of input data sets are processed by data processing apparatus, specimen data chunks corresponding to the constituent input data chunks of those input data sets may be distributed across the various chunk sections of the chunk store. Especially as chunk sections reach their respective capacities, then subsequent specimen data chunks may be stored in chunk sections which are physically apart from (but logically adjacent) the chunk sections containing specimen data chunks corresponding to input data chunks of a given input data set. In time, the logical organisation of chunk sections may substantially be different to the physical arrangement of those chunk sections in the chunk store. Further, where specimen data chunks may have previously been clustered together in chunk sections, such clustering, in time, may not readily permit efficient restoration of a more recent input data set. This is because the order of some of the constituent input data chunks of more recent input data sets may no longer be similar to the order of some constituent input data chunks of the input data set being processed when that clustering was effected. Inefficiencies in processing times and data restoration may be experienced as a result.

In an embodiment of the present invention, the data processing apparatus is operable to commission a new chunk store for use by the data processing apparatus. In such an embodiment, the existing chunk store is retired from use. In one embodiment, it may be stored in a remote location, external to the data processing apparatus. However, if any manifests compiled when that chunk store was in use need to be restored, then access to that retired chunk store will still be allowed. However, that chunk store will no longer be primarily used by the data processing apparatus when processing new input data sets. No new specimen data chunks may be added to the retired chunk store.

An advantage of commissioning a new chunk store is that the input data chunks corresponding to subsequently processed input data sets may be more efficiently and optimally stored in the chunk sections of the new chunk store. As a consequence, the recovery of the subsequent input data sets may be more quickly performed than if the old, now retired, chunk store were to still be used by data processing apparatus.

In one embodiment, a new chunk store may be commissioned after a predetermined period of time or number of operations. In another embodiment, the new chunk store may be commissioned after a predetermined number of back-ups. For example, a new chunk store may be commissioned every six months.

In one embodiment, as opposed to having to store each retired chunk store, in case any manifest produced when using those retired chunk stores need to be restored, another embodiment provides for each of the manifests compiled when using a retired chunk store to be "restored". Each of the restored manifests, or rather the input data sets which they represent, is then re-processed by the data processing apparatus using the new chunk store. Since such a process may be computationally intensive, it may be performed at "off peak" times, such as when input data sets are not being processed by data processing apparatus.

In a still further embodiment, as opposed to "retiring" chunk stores periodically, another embodiment of the present invention provides a data processing apparatus which occasionally or periodically adds all input data chunks of an input data set as specimen data chunks to the chunk store. This is regardless of whether any of the input data chunks of the input data set being processed already exist as specimen data chunks in the chunk store. A disadvantage of such an arrangement is that duplication of some identical specimen data chunks is promoted in the chunk store. However, a benefit is that the recovery of any of the newly processed data sets is improved, since all of the specimen data chunks corresponding to the input data chunks of an input data set are likely to be stored close to one another in the chunk section. All manifests compiled for subsequently processed input data sets will reference the "newly added" specimen data chunks, and not the specimen data chunks previously stored in the chunk store.

In time, as manifests are deleted from the manifest store, some of the older duplicated specimen data chunks in the chunk store will no longer be referenced by any manifest and may therefore be deleted. As a consequence, only one instance of a particular specimen data chunk may exist in the chunk store, which is the most recently added instance of that specimen data chunk.

However, the deletion of the older duplicated specimen data chunks may take some time, since not all of the manifests which reference those older specimen data chunks may be deleted. They may continue to be stored two instances of the same specimen data chunk in the chunk section. In an embodiment of the present invention, the data processing apparatus is operable to retrieve and analyse all manifests stored in the manifest store which reference the older duplicate specimen data chunks. When a reference to a specimen data chunk is identified which has a newer specimen data chunk in the chunk store, then that reference in the manifest may be amended so as to refer to the most recent duplicate specimen data chunk added to the chunk store. As a result of such processing, there will become a time where the oldest duplicate specimen data chunks will no longer be referenced by any manifests in a manifest store and these may then be deleted. Duplication of specimen data chunks in a chunk store may then be reduced.

In one embodiment, when a duplicate specimen data chunk is created, the 'back-references' associates with the first (oldest) copy of the specimen data chunk may be analysed to determine how many, and which, manifests contain a reference to that specimen data chunk. The references of the manifests identified may then be amended to refer instead to the second (newest) copy of that specimen data chunk. When all the back references associated with the first copy of the specimen data chunk have been removed (and allocated to the second copy of the specimen data chunk, the first copy may be deleted.

The above operation may selectively be performed on old duplicated specimen data chunks, or on specific manifests which reference old specimen data chunks.

For example, the operation may be performed on manifests whose restoration process is known or predicted to be computationally intensive. For example, some manifests may reference a very high number of chunk sections spread across the chunk store, either physically or logically. It may be beneficial to amend such manifests so that the number of chunk sections it references is reduced. For example, a manifest may reference a first chunk section containing specimen data chunk A and a second chunk section containing specimen data chunk B. However, as a result of carrying out the above-described embodiment, it may be determined that the second chunk section also contains a newer, duplicated, version of specimen data chunk A. It may be beneficial for the manifest to be amended so that it references a single chunk section containing a copy of both specimen data chunk A and B. Indeed, in one embodiment, where a given manifest references more than a predetermined number of separate chunk sections, then all of the specimen data chunks referenced by that manifest may simply be duplicated into a new chunk section, and the manifest references re-configured so as to only refer to one or a few chunk sections containing the newly added duplicated specimen data chunks.

In an embodiment of the present invention, there is provided a data processor, comprising a plurality of chunk sections, each storing specimen data chunks, the data processor being operable to: process input data into input data chunks; identify at least one input data chunk not already stored in a chunk section as a specimen data chunk; and store said at least one input data chunk, as a specimen data chunk, in a chunk section which does contain a specimen data chunk corresponding to at least one of said input data chunks.

In another embodiment of the present invention, there is provided data storage apparatus comprising: a data storage medium provisioned with a plurality of chunk sections, at least one of said chunk sections storing specimen data chunks; and a read/write head to read information from, or write information to, the data storage medium, the read/write head being operable to read/write a predetermined maximum extent of data in a single operation, the apparatus being operable to: divide an input data set into input data chunks; identify an input data chunk corresponding to a specimen data chunk stored in a chunk section; and store a further input data chunk of the input data set as a specimen data chunk in the data storage medium, such that both the specimen data chunks may be accessed by the read/write head in a single operation.

With reference to FIG. 9, an embodiment of the present invention provides a method of processing data using: a plurality of chunk sections, each operable to store specimen data chunks, the method comprising: processing 14 an input data set into input data chunks; identifying 15 a specimen data chunk in a chunk section which corresponds to a first input data chunk; identifying 16 a second input data chunk not corresponding to a specimen data chunk in the chunk store; and storing 17 the second input data chunk as a specimen data chunk in deliberate proximity to the identified specimen data chunk corresponding to the first input data chunk.

In one embodiment, the method further comprises: identifying further input data chunks not corresponding to specimen data chunks already in the chunk store; and storing said input data chunks as specimen data chunks in at least one chunk section containing at least one specimen data chunk that does correspond to at least one input data chunk of the input data set.

In another embodiment of the present invention, the method comprises: a data storage medium provisioned with a plurality of chunk sections storing specimen data chunks; and a read/write head to read information from, or write information to, the data storage medium, the read/write head being operable to read/write a predetermined maximum extent of data in a single operation, the method comprising: arranging at least two specimen data chunks, corresponding to respective input data chunks, on the data storage medium such that the at least two specimen data chunks may be accessed by the read/write head in a single operation.

Data processing apparatus may be used in compacting input data sets 1 for storage, encryption or transmission. For example the input data 1 may represent sets of back-up data from a primary data storage medium, for storing on a secondary data storage medium.

The data processing apparatus 3 may form part of a data compaction, or de-duplication, management system. The data processing apparatus 3 may be integrated into a data storage system. A data processing apparatus 3 may be configured to operate 'actively', as data is sent to the data storage system for storage. Compaction may be performed in real time. Alternatively, data may be presented to the data processing apparatus 3 during 'off peak' periods. By off peak is meant periods where data may not be being presented to a data storage system for storage, and thus data processing apparatus 3 may process data already stored on the data storage system, to reduce any duplicated data already stored on the data storage system. Data processing apparatus may form part of a data housekeeping system of a data storage system.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. An apparatus comprising:
    a chunk store having a plurality of chunk sections each storing specimen data chunks;
    a manifest store for containing a manifest representing at least part of a data set and having references to said chunk sections;
    at least one processor configured to: process an input data set into input data chunks; identify, using the manifest, a specimen data chunk in a given one of said chunk sections which corresponds to a first of the input data chunks; identify a second of the input data chunks not corresponding to a specimen data chunk in the chunk store; store the second input data chunk as a specimen data chunk in deliberate proximity to the identified specimen data chunk, wherein the storing in deliberate proximity results in selecting the given chunk section rather than another of said chunk sections to store the second input data chunk as a specimen data chunk; associate a specimen data chunk in at least one chunk section with a back-reference to a manifest referencing that specimen data chunk; determine when a given specimen data chunk is not associated with a back-reference to a manifest; delete the given specimen data chunk from a particular chunk section after a predetermined time period or number of iterations in response to determining that the given specimen data chunk is not associated with a back-reference to a manifest; and after the deleting, reduce fragmentation of the particular chunk section by rearranging chunks remaining in the particular chunk section.

2. The apparatus according to claim 1, wherein the at least one processor is configured to store the second input data chunk as a specimen data chunk in physical proximity to the identified specimen data chunk corresponding to the first input data chunk.

3. The apparatus according to claim 1, wherein the at least one processor is configured to store the second input data chunk as a specimen data chunk in the given chunk section such that both the specimen data chunks corresponding to the first and second input data chunks are readable from the chunk store in a single read/write operation.

4. The apparatus according to claim 1, wherein if at least a predetermined number of input data chunks are found not to correspond to specimen data chunks in the chunk store, the at least one processor is configured to store the said input data chunks as specimen data chunks in proximity to one another in at least one chunk section.

5. The apparatus according to claim 4, wherein the said at least one chunk section is at least one chunk section other than the given chunk section containing the identified specimen data chunk.

6. The apparatus according to claim 1, wherein the at least one processor is configured to analyze the input data set; and store the second input data chunk as a specimen data chunk in deliberate proximity to the identified specimen data chunk corresponding to the first input data chunk, only if the input data set has a predetermined characteristic.

7. The apparatus according to claim 6, wherein the predetermined characteristic is that the input data set is deemed by the apparatus to represent a full back up.

8. The apparatus according to claim 1, wherein at least one chunk section is configured to contain at least one reference to at least one manifest referencing at least one specimen data chunk contained in the at least one chunk section.

9. The apparatus according to claim 1, wherein at least one chunk section is configured to maintain a record of the location of at least one specimen data chunk contained in the at least one chunk section.

10. The apparatus according to claim 1, wherein the at least one processor is configured to: analyze back-references to manifests referencing a particular specimen data chunk; move the particular specimen data chunk within the chunk store; and amend references of the manifests to refer to the moved particular specimen data chunk.

11. The apparatus according to claim 1, wherein the at least one processor is configured to periodically commission a new chunk store for use by the data processing apparatus, and to retire a previous chunk store from use.

12. The apparatus according to claim 1, wherein the manifest store is to store manifests, each of the manifests representing a corresponding input data set and containing references to respective chunk sections in the chunk store,
wherein the at least one processor is configured to:
use a particular one of the manifests to identify the specimen data chunk corresponding to the first input data chunk; and
associate a particular specimen data chunk with back-references to plural ones of the manifests, each of the plural manifests containing a reference to the particular specimen data chunk.

13. The apparatus according to claim 12, wherein the at least one processor is configured to further:
in response to a deletion of one of the plural manifests, remove a corresponding one of the back-references associated with the particular specimen data chunk.

14. The apparatus according to claim 13, wherein the at least one processor is configured to further:
delete the particular specimen data chunk in response to detecting that there are no back-references to manifests associated with the particular specimen data chunk resulting from deletion of each of the plural manifests.

15. A data storage apparatus comprising:
a data storage medium provisioned with a plurality of chunk sections, at least one of said chunk sections storing specimen data chunks;
a read/write head to read information from, or write information to, the data storage medium, the read/write head being configured to read/write a predetermined maximum extent of data in a single operation;
a manifest store to store manifests, each of the manifests representing a corresponding input data set and containing references to respective specimen data chunks or chunk sections;
at least one processor configured to:
divide a particular input data set into input data chunks;
identify a specimen data chunk in one of the chunk sections that corresponds to a first of the input data chunks, where the identifying is based on use of one of the manifests;
store a further one of the input data chunks of the particular input data set as a specimen data chunk in the data storage medium, such that both the specimen data chunks may be accessed by the read/write head in a single operation;
associate a given specimen data chunk with back-references to plural ones of the manifests, each of the plural manifests containing a reference to the given specimen data chunk;
determine when a particular specimen data chunk is not associated with a back-reference to a manifest;
delete the particular specimen data chunk from a particular one of the chunk sections after a predetermined time period or number of iterations; and
after the deleting, reduce fragmentation of the particular chunk section by rearranging chunks remaining in the particular chunk section.

16. The data storage apparatus according to claim 15, wherein the at least one processor is configured to further:
in response to a deletion of one of the plural manifests, remove a corresponding one of the back-references.

17. The data storage apparatus according to claim 16, wherein the at least one processor is configured to further:

delete the given specimen data chunk in response to detecting that there are no back-references to manifests associated with the given specimen data chunk resulting from deletion of each of the plural manifests.

18. A method comprising:

storing a chunk store containing a plurality of chunk sections each storing specimen data chunks;

storing a manifest store that contains manifests, each of the manifests representing a corresponding input data set and containing references to respective specimen data chunks or chunk sections;

processing an input data set into input data chunks;

identifying, using one of the manifests, a specimen data chunk in a given one of the chunk sections which corresponds to a first of the input data chunks;

identifying a second of the input data chunks not corresponding to a specimen data chunk in the chunk store;

storing the second input data chunk as a specimen data chunk in deliberate proximity to the identified specimen data chunk, wherein the storing in deliberate proximity results in selecting the given chunk, section rather than another of the chunk sections to store the second input data chunk as a specimen data chunk;

associating a given specimen data chunk with back-references to plural ones of the manifests, each of the plural manifests containing a reference to the given specimen data chunk;

determining when a particular specimen data chunk is not associated with a back-reference to a manifest;

deleting the particular specimen data chunk from a particular one of the chunk sections after a predetermined time period or number of iterations; and after the deleting, reducing fragmentation of the particular chunk section by rearranging chunks remaining in the particular chunk section.

19. The method according to claim 18, comprising:

identifying further input data chunks not corresponding to specimen data chunks already in the chunk store; and storing said further input data chunks as specimen data chunks in at least one chunk section containing at least one specimen data chunk that does correspond to at least one input data chunk of the input data set.

20. The method according to claim 18, further comprising:

in response to a deletion of one of the plural manifests, removing a corresponding one of the back-references associated with the given specimen data chunk.

21. The method according to claim 20, further comprising:

deleting the given specimen data chunk in response to detecting that there are no back-references to manifests associated with the given specimen data chunk resulting from deletion of each of the plural manifests.

* * * * *

UNITED STATES PATENT AND TRADEMARK OFFICE
CERTIFICATE OF CORRECTION

PATENT NO. : 8,838,541 B2
APPLICATION NO. : 12/671334
DATED : September 16, 2014
INVENTOR(S) : Peter Thomas Camble et al.

Page 1 of 1

It is certified that error appears in the above-identified patent and that said Letters Patent is hereby corrected as shown below:

In the Claims

Column 27, line 22 claim 18, delete "chunk," and insert -- chunk --.

Signed and Sealed this
Seventeenth Day of February, 2015

Michelle K. Lee
*Deputy Director of the United States Patent and Trademark Office*